(12) United States Patent
Lee et al.

(10) Patent No.: US 12,051,055 B2
(45) Date of Patent: *Jul. 30, 2024

(54) FINANCIAL PAYMENT METHOD AND PAYMENT SYSTEM USING MOBILE DEVICE

(71) Applicant: GHOST PASS Inc., Gwangju (KR)

(72) Inventors: Seon Gwan Lee, Gwangju (KR); Jun Young Kwon, Seoul (KR)

(73) Assignee: Ghost Pass Inc., Gwangju (KR)

( * ) Notice: Subject to any disclaimer, the term of this patent is extended or adjusted under 35 U.S.C. 154(b) by 287 days.

This patent is subject to a terminal disclaimer.

(21) Appl. No.: 17/454,179

(22) Filed: Nov. 9, 2021

(65) Prior Publication Data

US 2022/0067695 A1    Mar. 3, 2022

Related U.S. Application Data

(63) Continuation-in-part of application No. 16/349,503, filed as application No. PCT/KR2017/012829 on Nov. 14, 2017, now Pat. No. 11,238,454.

(30) Foreign Application Priority Data

Nov. 14, 2016 (KR) .................. 10-2016-0151016
Nov. 9, 2020 (KR) .................. 10-2020-0148635

(51) Int. Cl.
G06Q 20/32      (2012.01)
G06F 21/60      (2013.01)
G06F 21/62      (2013.01)

(52) U.S. Cl.
CPC ....... *G06Q 20/3227* (2013.01); *G06F 21/602* (2013.01); *G06F 21/6245* (2013.01)

(58) Field of Classification Search
None
See application file for complete search history.

(56) References Cited

U.S. PATENT DOCUMENTS 6,167,517 A * 12/2000 Gilchrist .......... G06Q 20/40145
                                              713/182
7,360,689 B2 * 4/2008 Beenau .............. H04L 63/0861
                                              340/5.4
7,565,329 B2 * 7/2009 Lapsley ................ G06Q 20/04
                                              435/5

(Continued)

FOREIGN PATENT DOCUMENTS

KR       10-0997820 B1     11/2010
KR    10-2011-0055112 A     5/2011

(Continued)

OTHER PUBLICATIONS

International Search Report and Written Opinion mailed Mar. 21, 2018 in International Application No. PCT/KR2017/012829, in 16 pages.

(Continued)

*Primary Examiner* — Christopher Bridges
(74) *Attorney, Agent, or Firm* — Knobbe, Martens, Olson & Bear, LLP

(57) ABSTRACT

This application relates to a financial payment method using biometric information, in which biometric information of an individual collected in a mobile device of an affiliated member is transmitted to a mobile device of the individual to allow the biometric information to be authenticated in the mobile device of the individual. After the authentication of the biometric information, a substitute key that corresponds to a card password preset by the individual is inputted, and a financial payment is requested based on the payment content.

20 Claims, 13 Drawing Sheets

(56) References Cited

U.S. PATENT DOCUMENTS

| | | | | |
|---|---|---|---|---|
| 8,028,896 | B2* | 10/2011 | Carter | G06Q 50/188 |
| | | | | 705/17 |
| 8,666,895 | B2* | 3/2014 | Grigg | G06Q 20/3223 |
| | | | | 705/16 |
| 8,762,211 | B2* | 6/2014 | Killian | G06Q 40/10 |
| | | | | 705/64 |
| 9,519,901 | B1* | 12/2016 | Dorogusker | G06Q 20/40145 |
| 9,537,654 | B2* | 1/2017 | Botero Montano | G06F 21/31 |
| 10,282,723 | B2* | 5/2019 | Lim | G06Q 20/227 |
| 10,380,605 | B2* | 8/2019 | Groff | G06Q 30/02 |
| 2003/0051138 | A1* | 3/2003 | Maeda | H04M 15/48 |
| | | | | 713/168 |
| 2010/0082444 | A1* | 4/2010 | Lin | G06Q 20/204 |
| | | | | 235/383 |
| 2016/0019547 | A1* | 1/2016 | Gurnani | G06Q 20/40 |
| | | | | 705/44 |
| 2019/0370688 | A1 | 12/2019 | Patel | |
| 2021/0090065 | A1* | 3/2021 | Behjat | G06Q 20/326 |

FOREIGN PATENT DOCUMENTS

| | | |
|---|---|---|
| KR | 10-2014-0141984 A | 12/2014 |
| KR | 10-2015-0088768 A | 8/2015 |
| KR | 10-2016-0002623 A | 1/2016 |
| KR | 10-2016-0013221 A | 2/2016 |
| KR | 10-2019-0136902 A | 12/2019 |
| KR | 10-2156184 B1 | 9/2020 |
| KR | 10-2020-0116758 | 10/2020 |

OTHER PUBLICATIONS

European Search Report issued in European Application No. 23177287.2 dated Aug. 30, 2023.

* cited by examiner

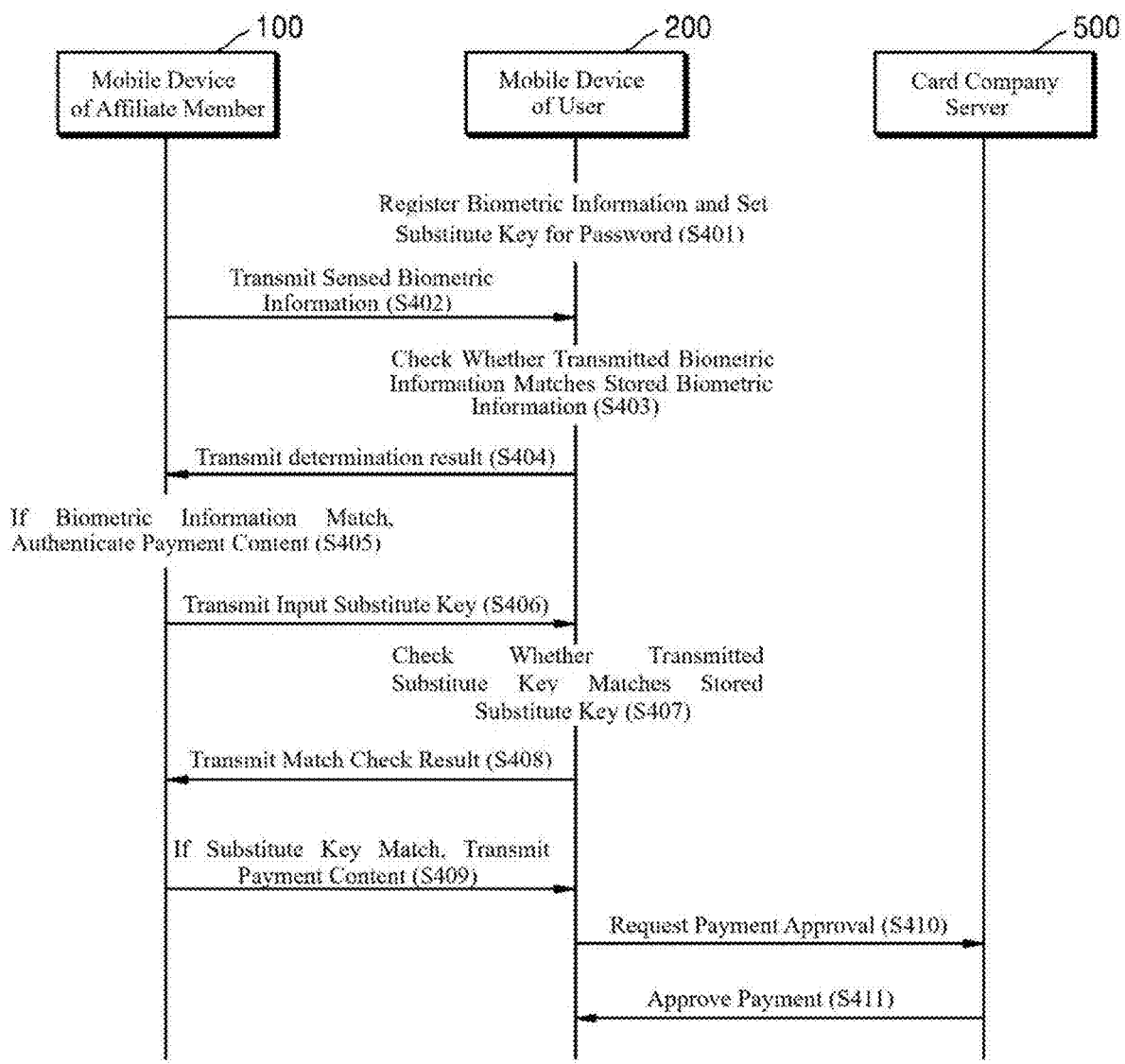

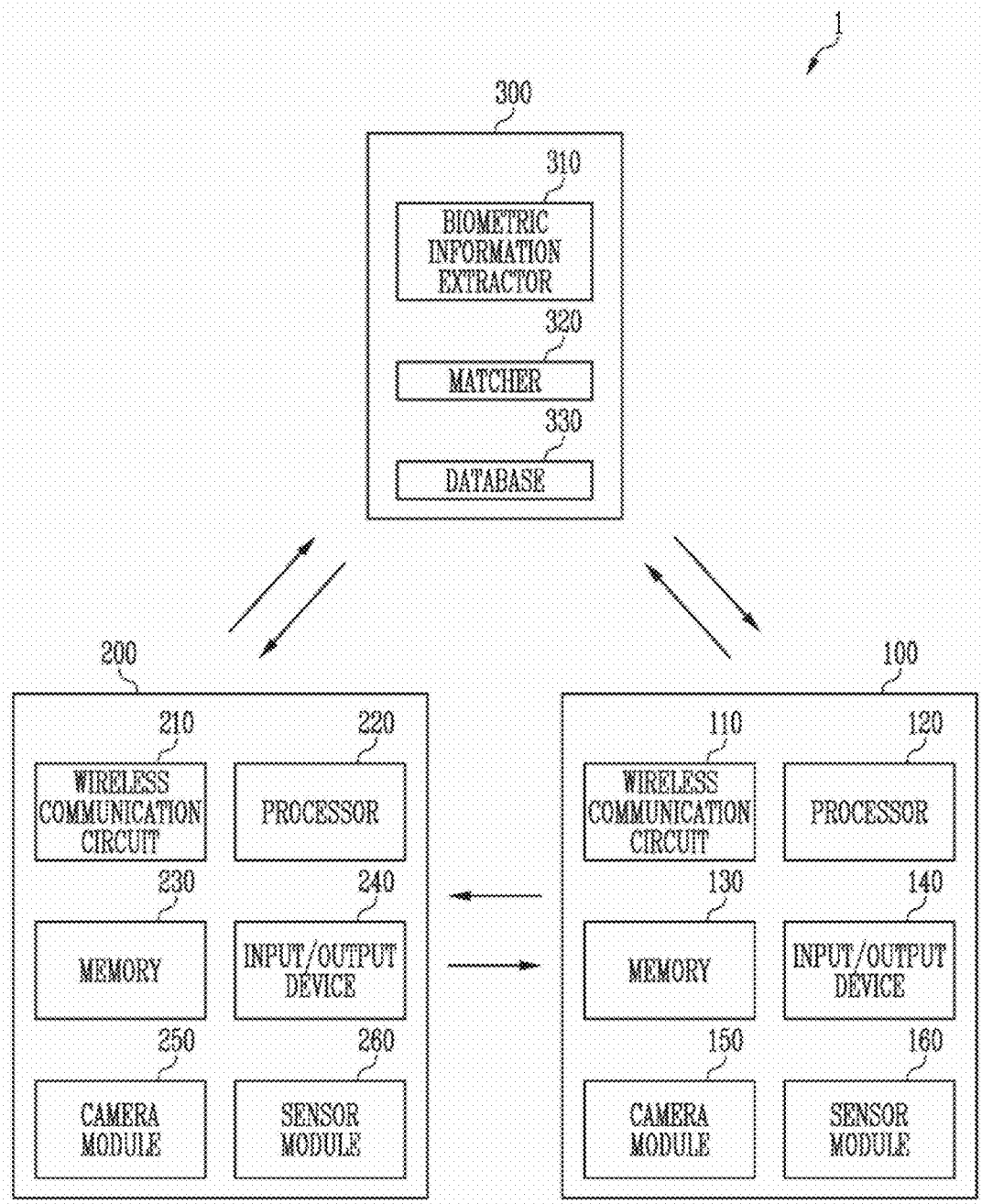

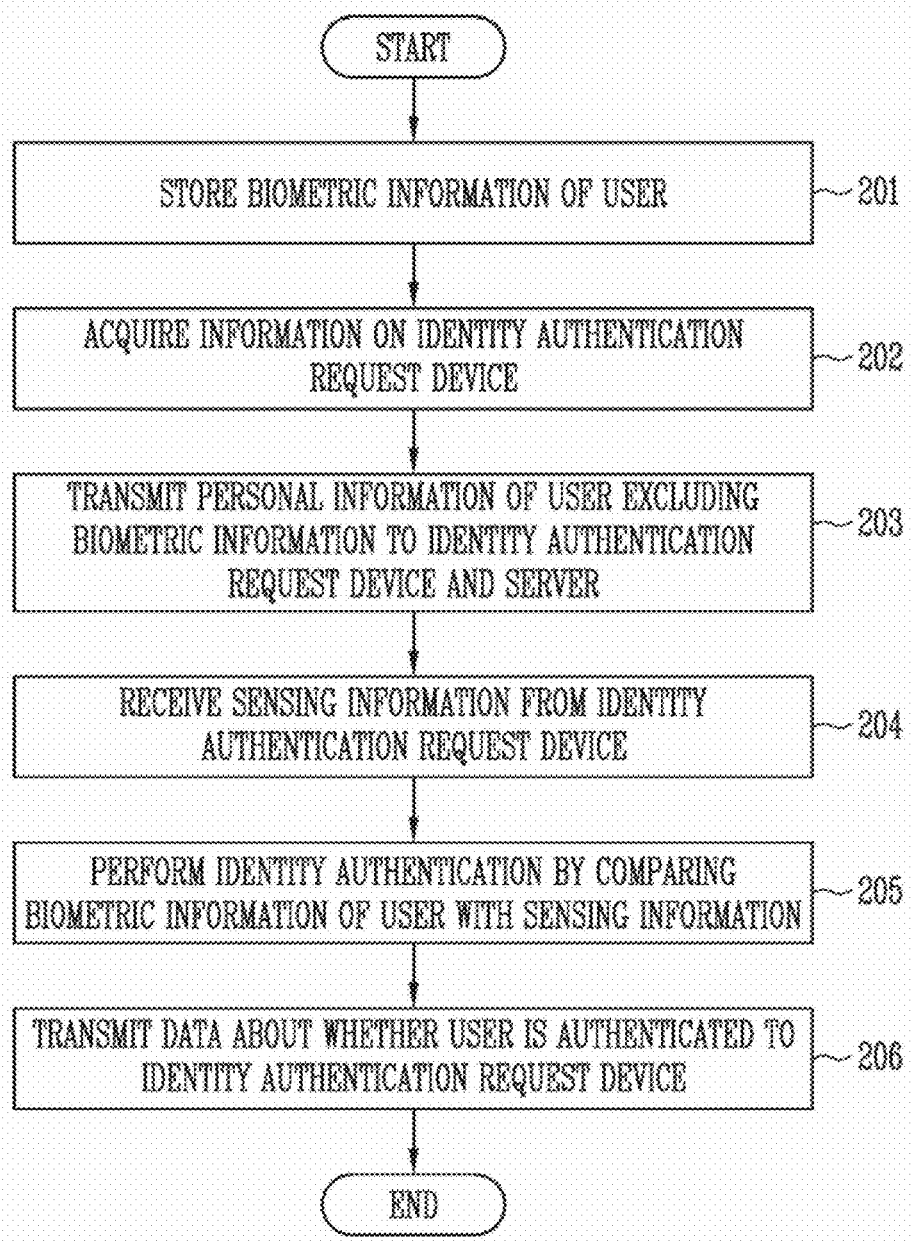

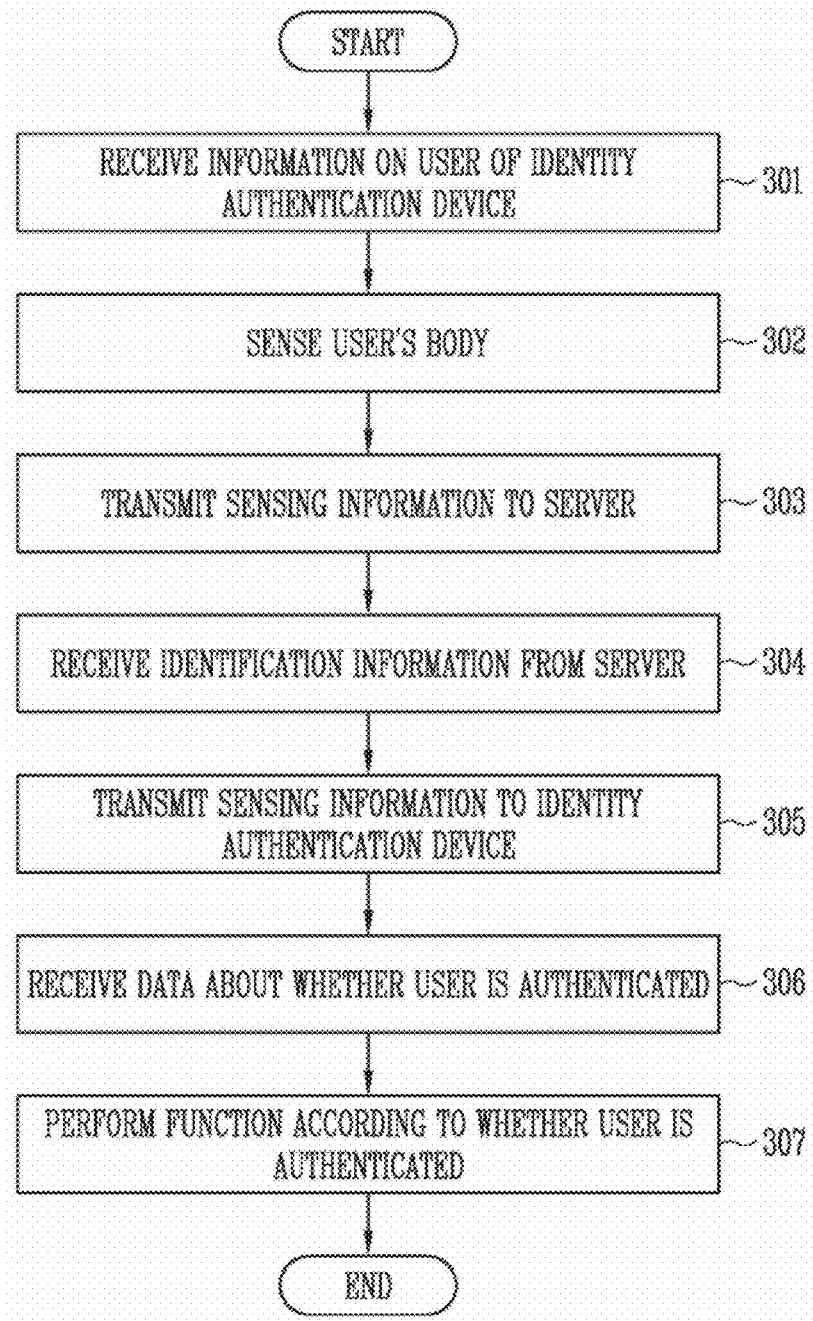

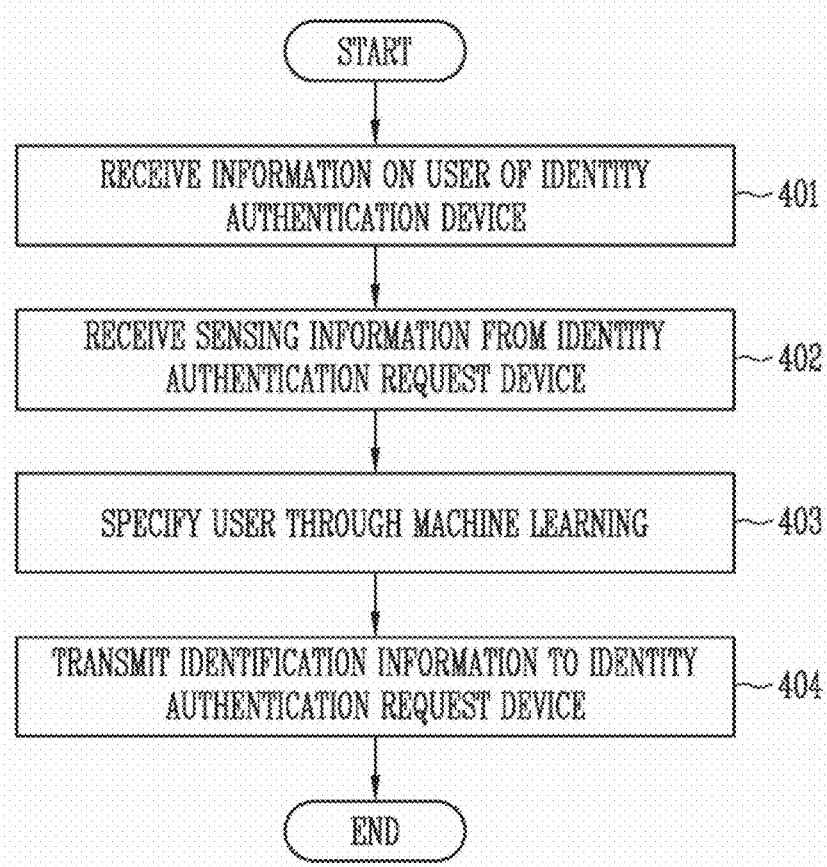

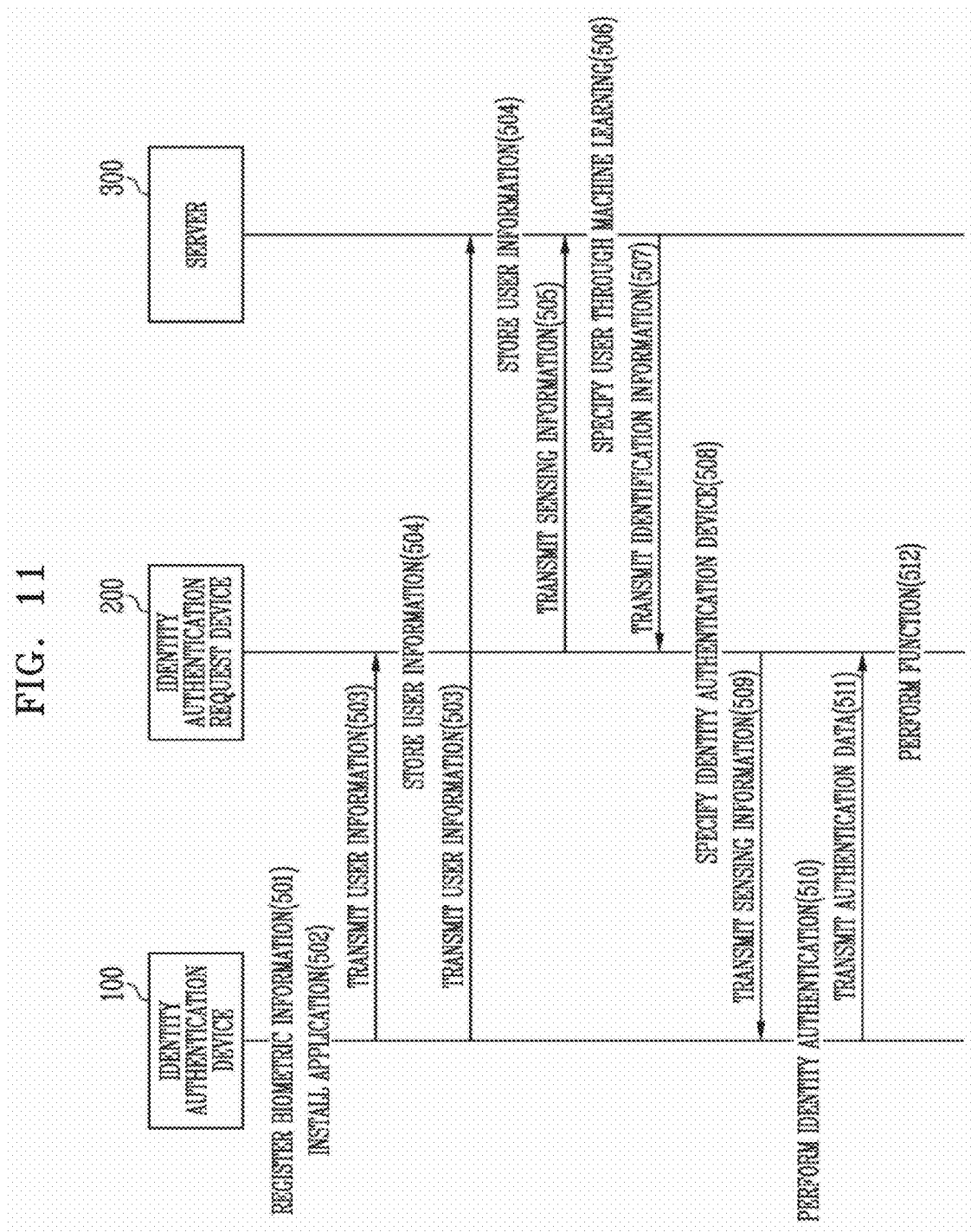

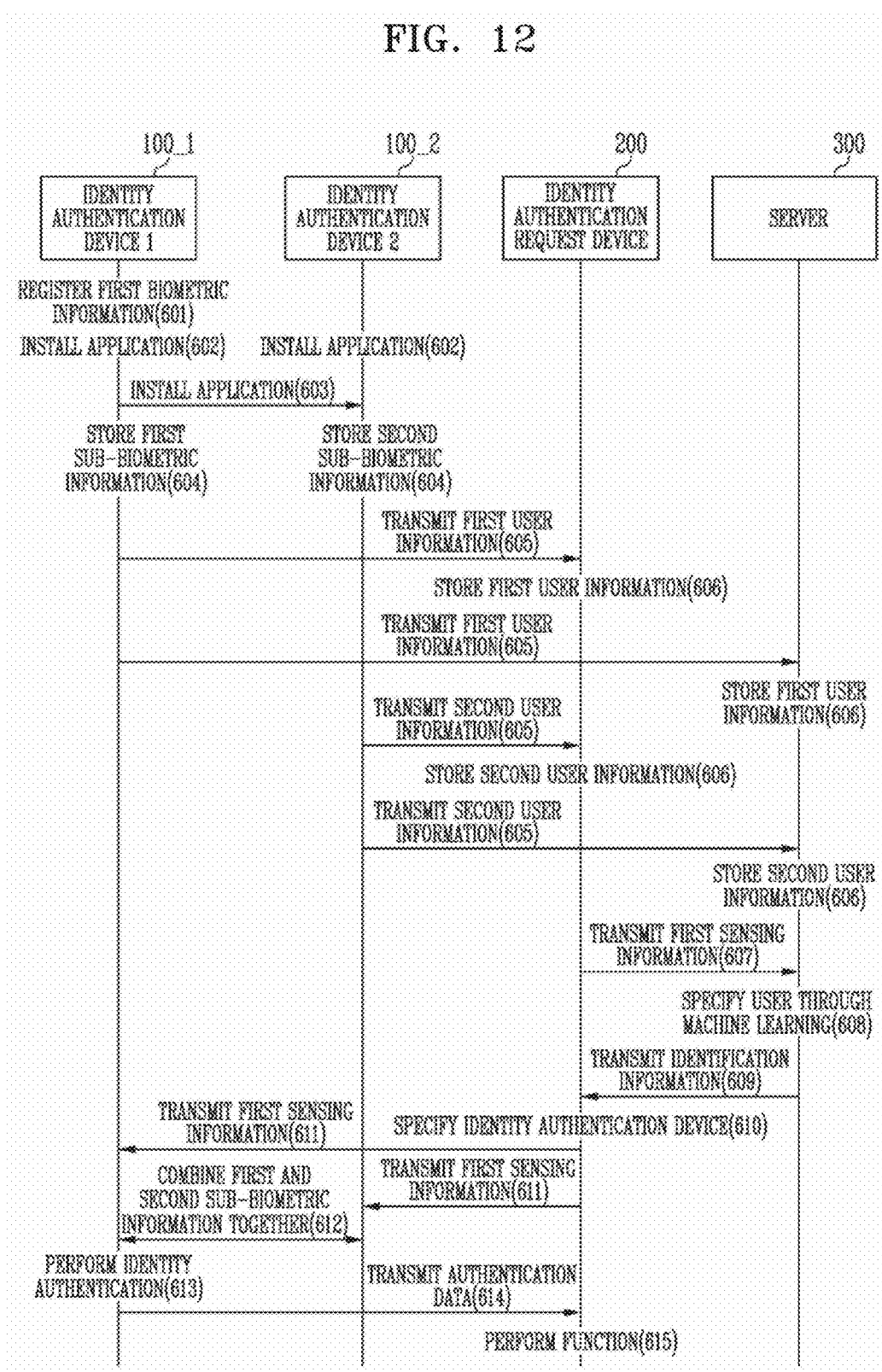

FINANCIAL PAYMENT METHOD AND PAYMENT SYSTEM USING MOBILE DEVICE

CROSS-REFERENCE TO RELATED APPLICATION

This application is Continuation-in-part of U.S. patent application Ser. No. 16/349,503 filed on May 13, 2019, which is a U.S. national phase application, pursuant to 35 U.S.C. § 371, of PCT/KR2017/012829, filed Nov. 14, 2017, designating the United States, which claims priority to Korean Patent Application No. 10-2016-0151016, filed Nov. 14, 2016. This application also claims priority to Korean Patent Application No. 10-2020-0148635, filed on Nov. 9, 2020. The entire contents of the aforementioned patent applications are incorporated herein by this reference.

BACKGROUND

Technical Field

The present disclosure relates to a financial payment method and payment system using a mobile device, and more particularly, to a method and system for making a payment by mutually verifying biometric information and financial information in two mobile devices.

The present disclosure also relates to an identity authentication system using biometric information of a user.

Description of Related Technology

A payment system based on fingerprint recognition was first introduced to private businesses in the U.S. in 2007. However, the payment system has limitations in protecting personal information in that biometric information of individuals are stored in a specific device of a third party or accessible through a network exposed to the risk of hacking, which is why the payment system is not widely used now. Moreover, the fingerprint recognition-based payment system imposes a cost constraint on offline affiliate members because every offline affiliate member should be provided with an expensive fingerprint sensor for fingerprint recognition. In 2007, businesses using the fingerprint recognition-based payment system actually declared bankruptcy because of financial deficit caused by the purchase of a 2 to 3 million-dollar payment POS device.

Recently, the Japanese government has attempted to adopt other fingerprint recognition-based payment systems. If a visitor to Japan puts two fingers on a fingerprint reader and inputs credit card information in an airport, the visitor may pay simply through fingerprint recognition in fingerprint recognition-enabled stores or hotels. For this purpose, the Japanese government announced that fingerprint recognition-based payment infrastructure would be deployed all over the nation by 2020 when the Olympics would be held in Tokyo. Although the attempt to deploy the fingerprint recognition-based payment infrastructure at the government level is highly likely to lead to wide use of the fingerprint recognition-based system, the fingerprint recognition-based system also has the same limitations as that in the U.S. due to the cost and insufficient protection of personal information.

Various electronic devices provide a variety of functions using users' biometric information. For example, a mobile electronic device allows its use by recognizing a user's face or iris. Also, a gate security system opens a gate by recognizing a user's fingerprint.

Various services provided using users' biometric information offer convenience to the users. However, there is a security problem which may cause fatal damage to the users when the users' biometric information is hacked or opened to the public. Accordingly, there are limitations in providing various functions.

Recently, to solve the security problem of biometric information leakage, research is under way on a technology for storing biometric information of a user in a mobile electronic device that the user possesses instead of a specific server.

Meanwhile, to perform identity authentication not through a specific server which uses a fixed Internet protocol (IP) address but through a mobile electronic device that a user possesses, it is necessary to manually input a code for identifying the mobile electronic device of the user for identity authentication every time, which is troublesome. For example, as an identification code, a mobile phone number, a personal identification number (PIN), or the like for identifying a mobile electronic device may be used.

SUMMARY

According to embodiments, a financial payment may be made without a physical card by means of a mobile device irrespective of time and place. Further, without the need for deploying additional infrastructure, a financial payment may be made using mobile devices which have been proliferated and are carried by a multitude of users.

Personal information of an individual such as a resident registration number, a fingerprint, and the like, and financial information of the individual such as a card number, a card password, and the like are stored in a mobile device carried by the individual. When the individual makes a financial payment, the personal information and financial information are verified in the mobile device. Therefore, the individual may make a safe financial payment without exposure of the personal information and the financial information.

In one aspect, the present disclosure provides a method of authenticating a financial payment at a first mobile device of a seller. The method comprises: sensing, by a sensor provided in the first mobile device, one or more pieces of biometric information of a purchaser; transmitting, by the first mobile device, the sensed biometric information to a second mobile device that is identified by the purchaser in a predetermined method; receiving, by the first mobile device, information from the second mobile device, wherein the information indicates whether the biometric information that is transmitted by the first mobile device matches biometric information of the purchaser that is pre-stored in the second mobile device; and authenticating, by the first mobile device, a content of the financial payment, when the biometric information that is transmitted by the first mobile device matches the biometric information that is pre-stored in the second mobile device.

In an embodiment, the biometric information may include one or more of fingerprint information, iris information, vein information, electrocardiogram information, and voice information.

In an embodiment, the authentication of the content of the financial payment may further comprise processing the payment in a payment method that is preset in the second mobile device. The preset payment method may comprise using a substitute key that corresponds to a password of a first payment means selected by the purchaser from among one or more payment means. The substitute key may be preset by the purchaser to correspond to a predetermined input key of each digit of the password, from among a set of input keys displayed on the first mobile device. The first payment means may be selected adaptively based on the payment content, from among preset one or more payment methods.

In one embodiment, the transmission of the sensed biometric information may comprise encrypting the sensed biometric information in a predetermined encryption method and transmitting the encrypted biometric information or converting the sensed biometric information to a file in a predetermined format and transmitting the file. The predetermined encryption method may be RC4, OTPad, DES, TDES, AES, IDEA, Dffie-Hellman, DSA, Elgamal, RSA, ECC, SHA, MD5, HAVAL, HMAC, or CBC-MAC. The file in the predetermined format may be an image file, a video file, or a voice file. The format of the file may be determined adaptively based on the sensed biometric information.

In another aspect, a method of performing a financial payment at a second mobile device identified by a purchaser is provided. The method comprises: receiving, by the second mobile device, biometric information of the purchaser from a first mobile device of a seller; verifying, by the second mobile device, whether the biometric information that is received from the first mobile device matches biometric information of the purchaser that is pre-stored in the second mobile device; receiving, by the second mobile device, authenticated payment content from the first mobile device, when the biometric information that is received from the first mobile device matches the biometric information of the purchaser that is pre-stored in the second mobile device; and performing, by the second mobile device, a payment in a payment method that is predetermined with regard to the payment content.

In an embodiment, the method may further comprise receiving one or more pieces of biometric information and one or more payment methods from the purchaser.

In an embodiment, the performing the payment may comprise using a substitute key that corresponds to a password of a first payment means selected by the purchaser. The substitute key may correspond to each digit of the password that is to be input by a user from a combination of input keys displayed on the first mobile device.

In an embodiment, in case of each of the one more payment methods, the first payment means may be set to be a discount for a payment amount, point accumulation, or a statement balance in an order determined by a preset priority. The priority may be reflected adaptively in the payment content.

In another aspect, a computing device including at least one processor, implemented at least temporarily by the at least one processor is provided. The computing device comprises: a sensor unit configured to sense one or more pieces of biometric information of a purchaser; a communication unit configured to transmit the sensed biometric information to a second mobile device that is identified by the purchaser in a predetermined method, and to receive information from the second mobile device in response to the transmission, wherein the information indicates whether the biometric information that is transmitted by the communication unit matches biometric information of the purchaser that is pre-stored in the second mobile device; and a computation unit configured to authenticate payment content, when the biometric information that is transmitted by the communication unit matches the biometric information that is pre-stored in the second mobile device.

In another aspect, a program stored in a computer-readable recording medium, for causing a computing device to perform a financial payment based on biometric information and financial information of a purchaser is provided. The program comprises: an instruction set for receiving, at a first mobile device of a seller, biometric information of the purchaser; an instruction set for verifying whether the biometric information that is received from the first mobile device matches biometric information of the purchaser that is pre-stored in the computing device; and an instruction set for, when the received biometric information matches the pre-stored biometric information, receiving authenticated payment content from the first mobile device, and performing the payment using a substitute key that is received from the purchaser and corresponds to a password of a first payment means that is selected by the purchaser for each of one or more payment methods.

The present disclosure is directed to providing an identity authentication system which allows non-face-to-face and contactless authentication and does not require the manual input of an identification code for identity authentication every time.

The present disclosure is also directed to providing an identity authentication system with an improved security level.

According to an aspect of the present disclosure, there is provided an identity authentication system including an identity authentication device in which first data including biometric information of a user is stored, an identity authentication request device configured to generate second data by sensing a body part of the user, and a server configured to receive the second data and select personal information of a user corresponding to the second data among pieces of pre-stored personal information of a plurality of users through machine learning of the second data.

The identity authentication request device may transmit the second data to the identity authentication device which is identified on the basis of the personal information of the user received from the server, and the identity authentication device may determine whether the first data corresponds to the second data and transmit authentication data to the identity authentication request device as a result of the determination.

When the authentication data is not received from the identified identity authentication device within a preset period, the identity authentication request device may output an identification failure message and transmit a retraining command to the server.

The identity authentication request device may perform a preset function when the authentication data includes the result representing that the first data corresponds to the second data and may output an authentication failure message when the authentication data includes the result representing that the first data does not correspond to the second data.

The first data may include face information of the user, and the second data may include an image of the user's face.

The machine learning may use at least one of a Haar-like algorithm and a convolutional neural network (CNN) algorithm.

The server may transmit the personal information to the identity authentication request device and then permanently delete the second data used for the machine learning.

The server may cumulatively store results of the machine learning as cumulative data.

The personal information may include a mobile phone number for identifying the identity authentication device.

The identity authentication device may include: a wireless communication circuit configured to receive the second data from the identity authentication request device, determine whether the first data corresponds to the second data, and transmit a result of the determination to the identity authentication request device; at least one processor electrically connected to the wireless communication circuit; and a memory electrically connected to the at least one processor and configured to store the first data.

The identity authentication device may further include a camera module or a sensor module, the at least one processor may acquire the first data on the basis of data obtained by sensing the user's body through the camera module or the sensor module, and the memory may store the first data in a secure region.

The identity authentication request device may include a sensor module, a camera module, a wireless communication circuit, and at least one processor electrically connected to the sensor module, the camera module, and the wireless communication circuit, the at least one processor may acquire the second data obtained by sensing the user's body through the sensor module or the camera module, the wireless communication circuit may transmit the second data to the identity authentication device, and the at least one processor may perform a predetermined function on the basis of the authentication data received from the identity authentication device through the wireless communication circuit.

The at least one processor may transmit the second data to the identity authentication device and then permanently delete the second data.

According to another aspect of the present disclosure, there is provided an identity authentication system including a plurality of identity authentication devices in which first data including biometric information of a user is stored in a distributed manner, an identity authentication request device configured to generate second data by sensing biometric information of the user, and a server configured to receive the second data and select personal information of the user corresponding to the second data among pieces of pre-stored personal information of a plurality of users through machine learning of the second data.

The identity authentication request device may transmit the second data to the plurality of identity authentication devices which are identified on the basis of the personal information of the user received from the server.

The plurality of identity authentication devices may determine whether the first data corresponds to the second data through mutual information exchange and transmit authentication data to the identity authentication request device as a result of the determination.

When the authentication data is not received from the plurality of identified identity authentication devices within a preset period, the identity authentication request device may output an identification failure message and transmit a retraining command to the server.

The identity authentication request device may perform a preset function when the authentication data includes the result representing that the first data corresponds to the second data and may output an authentication failure message when the authentication data includes the result representing that the first data does not correspond to the second data.

The first data may include face information of the user, and the second data may include an image of the user's face.

The machine learning may use at least one of a Haar-like algorithm and a CNN algorithm.

The server may transmit the authentication data to the identity authentication request device and then permanently delete the second data used for the machine learning.

The server may cumulatively store results of the machine learning as cumulative data.

The personal information of the user may include mobile phone numbers for identifying each of the plurality of identity authentication devices.

According to the embodiments, even when a financial payment is made using biometric information of an individual, which has strict personal information protection requirements, there is no risk of exposing the biometric information to any devices other than a mobile device of the individual.

Due to the use of widely available mobile devices, both of an individual as a consumer and a business provider as a supplier may make a financial payment with low cost, using biometric information.

A financial payment may proceed in any of various user-selected payment methods, and due to use of a substitute key that corresponds to a password of a financial payment means, exposure of the password of a user to a mobile device of an affiliate member may be prevented.

BRIEF DESCRIPTION OF THE DRAWINGS

FIG. 4 is a sequence diagram illustrating interactions among a user mobile device, an affiliate member mobile device, and a card company server according to an embodiment.

FIG. 7 is a block diagram of an identity authentication system according to an exemplary embodiment of the present disclosure.

FIG. 8 is a flowchart illustrating a method of performing identity authentication by an identity authentication device according to an exemplary embodiment of the present disclosure.

FIG. 9 is a flowchart illustrating a method of requesting, by an identity authentication request device, identity authentication from an identity authentication device using sensing data obtained by sensing a user's body according to an exemplary embodiment of the present disclosure.

FIG. 10 is a flowchart illustrating a method of specifying, by a server, a user whose identity authentication is requested using sensing data obtained by sensing a user's body and transmitting identification information to an identity authentication request device according to an exemplary embodiment of the present disclosure.

FIG. 11 is a sequence diagram illustrating an identity authentication process triggered by an identity authentication request among an identity authentication device, an identity authentication request device, and a server according to an exemplary embodiment of the present disclosure.

FIG. 12 is a sequence diagram illustrating an identity authentication process triggered by an identity authentication request among an identity authentication device, an identity authentication request device, and a server according to another exemplary embodiment of the present disclosure.

DETAILED DESCRIPTION

Figure 1:
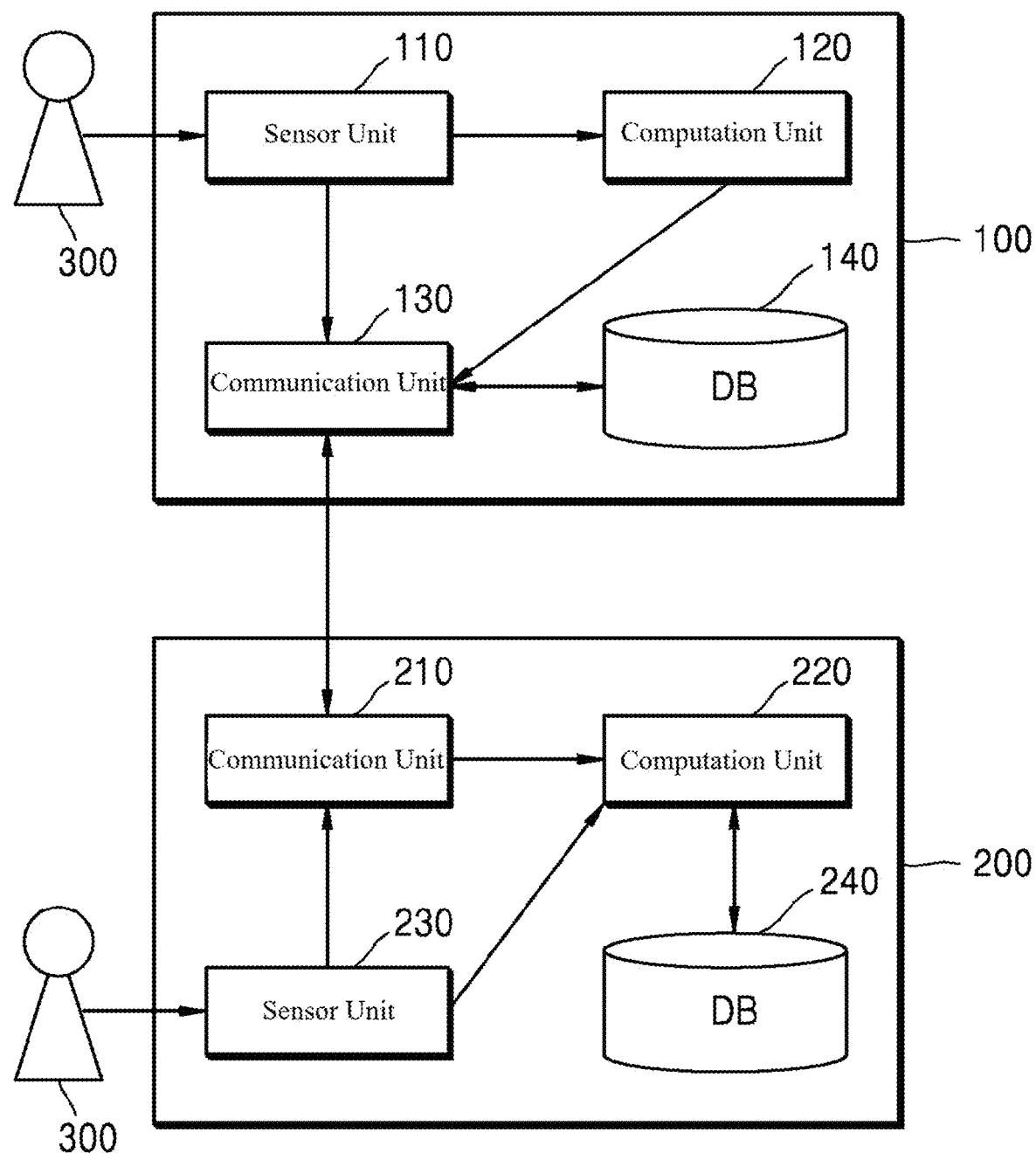
FIG. 1 is a block diagram of a system for processing a financial payment by verifying biometric information, using two mobile devices according to an embodiment.

Embodiments will be described in detail with reference to the attached drawings. However, these embodiments do not limit the scope of the disclosure. In each drawing, like reference numerals denote the same components.

Although terms used in the following description are selected as having general meanings in the related art, the terms may be replaced with other terms according to technology development and/or change, customs, operator preferences, and the like. Therefore, the terms used in the following description should be understood as exemplary terms used to describe the embodiments, not as limiting technical ideas.

Further, the applicant selects some terms arbitrarily in a specific case. In this case, the detailed meanings of the terms will be specified in a corresponding part of the description. Therefore, the terms used herein should be understood not by their names but by their meanings and what is set forth through the specification.

FIG. 1 is a block diagram of a system for processing a financial payment by verifying biometric information, using two mobile devices according to an embodiment. In an embodiment, a financial payment may be made between a user (a purchaser, a consumer, or an individual) and an affiliate member (a seller, a supplier, or a business provider) through interaction between a mobile device 100 of the affiliate member (seller) and a mobile device 200 of the user (purchaser), such as verifying biometric information and financial information between the mobile devices 100 and 200.

The mobile device 100 of the affiliate member includes a sensor unit 110 for sensing biometric information such as a fingerprint, an iris, and the like from a user 300, a communication unit 130 for transmitting and receiving data to and from another device through a wired or wireless network, a computation unit 120 for generating payment content, requesting payment, and approving payment, and a database (DB) 140.

The mobile device 200 of the user includes a sensor unit 230 for sensing biometric information such as a fingerprint, an iris, and the like from the user 300, a communication unit 210 for transmitting and receiving data to and from another device through a wired or wireless network, a computation unit 220 for verifying data match, performing encryption or decryption for the verification of the data match, or pre-registering personal information, biometric information, financial information, and the like, and a DB 240 for storing data that require personal information security, such as personal information, biometric information, financial information, and the like.

According to an embodiment, biometric information of the user 300 is sensed by the mobile device 100 of the affiliate member, the sensed biometric information is authenticated by the mobile device 200 of the user 300, and the financial payment is made in a preset user payment method, for example, with a pre-registered credit card. To do this, a substitute key can be inputted on the mobile device 100 of the affiliate member, the inputted substitute key can be authenticated by the mobile device 200 of the user 300, and a request for payment by the credit card can be made on the mobile device 200, thereby processing the payment by a server (not shown) of a company managing the credit card. In the financial payment method according to an embodiment, since all of personal information, biometric information, and financial information of the user 300 that need to be securely protected are authenticated directly by the mobile device 200 of the user 300, a high level of information protection can be achieved. The user 300 may make a financial payment directly through the mobile device 100 of the affiliate member by using the user's biometric information and the information (the personal information, the biometric information, the financial information, and the like) set in the mobile device 200, without having to use a physical card.

More specifically, interaction between the mobile device 100 of the affiliate member and the mobile device 200 of the user will be described in detail with reference to FIGS. 2 and 3.

Figure 2:
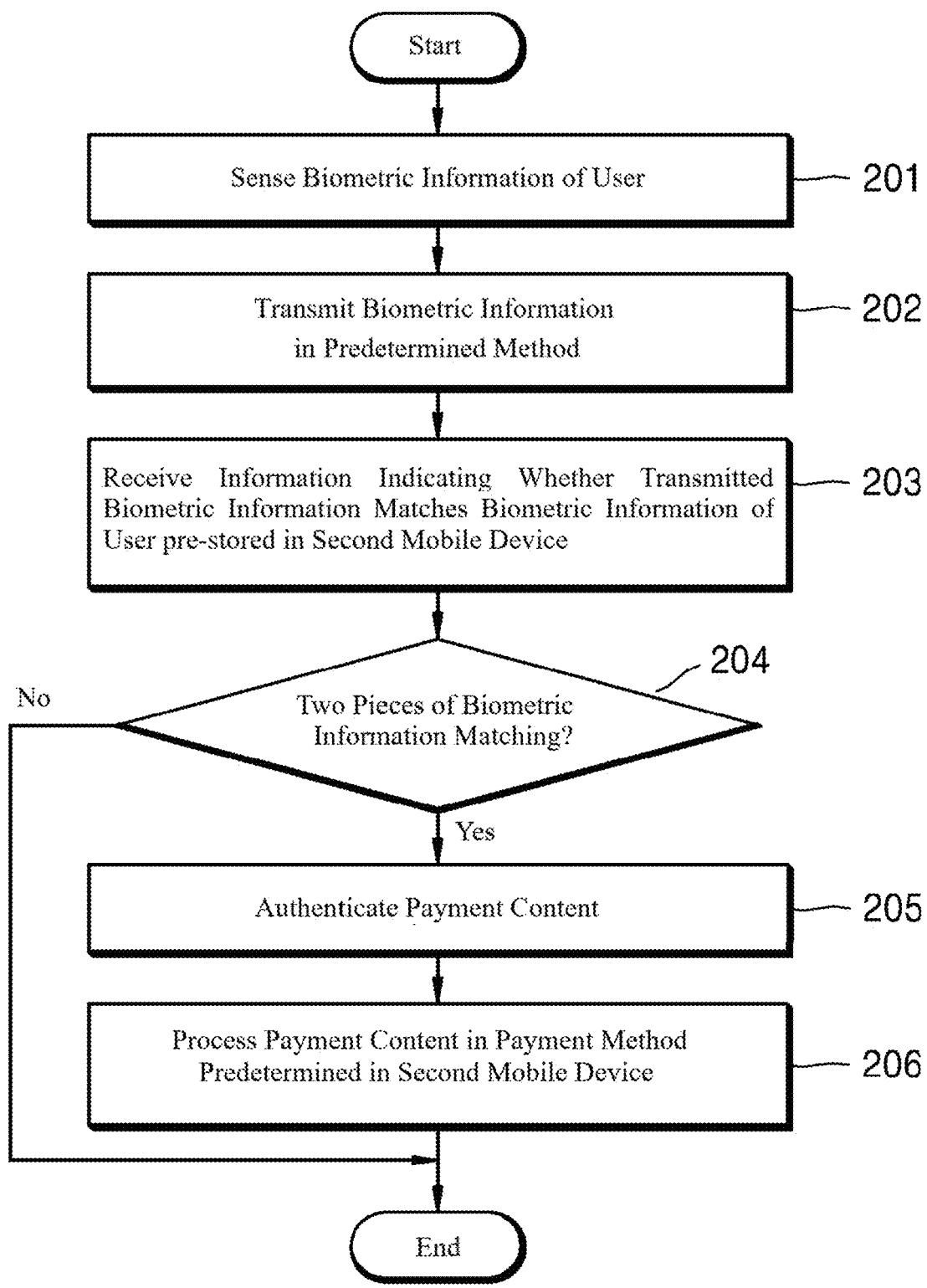
FIG. 2 is a flowchart illustrating a method of processing a financial payment by verifying biometric information of a consumer according to an embodiment.

FIG. 2 is a flowchart illustrating a method of processing a financial payment by verifying biometric information of a consumer according to an embodiment. When a financial payment is processed by verifying biometric information of a consumer in a mobile device of an affiliate member, the following steps may be performed.

In step 201, one or more pieces of biometric information of a user are sensed. The user refers to an individual (i.e., a consumer) who is to pay. The biometric information may be a fingerprint, an iris, a vein at a specific position, an electrocardiogram, or voice. Further, the fingerprint may be a fingerprint of a specific finger set by the user (e.g., a fingerprint of the left ring finger). Regarding the iris, the user may preset the left pupil, the right pupil, or both pupils, and use the preset pupil(s) as an object to be sensed. Regarding the vein at a specific position, the user may preset a position such as information on a vein on the right palm or the left wrist. Regarding the voice, various types of sounds in addition to the voice are available, such as whistle, cough, and the like. In case of the voice, a specific word, sentence, name, or the like, which is spoken, may be preset. As such, biometric information is not only information sensed from a part of the user's body but also any type of information selected and set by a user, thereby ensuring a high level of security for financial transactions. In other words, as a user can set the biometric information on his or her own (without sharing it with others), a wide choice of biometric information is available for financial transactions.

For example, in step 201, a user A may pre-register the fingerprint of his/her left ring finger in his/her mobile device (referred to as a 'second mobile device') and allow a mobile device of an affiliate member (referred to as a 'first mobile device') to recognize the fingerprint of the left ring finger, thereby enabling the fingerprint information of the user A to be sensed as biometric information.

In step 202, the mobile device of the affiliate member transmits the sensed biometric information to the mobile device of the user in a predetermined method. The mobile device of the user to receive the sensed biometric information may be identified by an input of the user. In other words, the user allows the user's biometric information to be sensed and inputs the user's mobile device number, thereby presenting a means to authenticate information of the user to the affiliation member.

Since biometric information may have various types, it may be transmitted in different file formats depending on the types of biometric information. Further, in view of the nature of biometric information, the biometric information may be encrypted for security in various manners or converted to a preset file format for transmission, instead of a file format inherent to the biometric information. For example, fingerprint information may be generated as an image file, encrypted in an SHA scheme, and then transmitted. Herein, the image file may be converted to one type selected from among various extensions. Alternatively, fingerprint information may be generated as a video file.

The encryption method may be appropriately selected and performed by an operator. For bi-directional encryption, RC4, OTPad, DES, TDES, AES, IDEA, and the like are available as a symmetrical key scheme, and Diffie-Hellman, DSA, Elgamal, RSA, ECC, and the like are available as an asymmetrical key scheme.

For uni-directional encryption that ensures integrity, SHA, MD5, HAVAL, HMAC, CBC-MAC, and the like are available. In various embodiments, any of the encryption methods may be selected and used. Particularly, a certain encryption method that is best for a particular type of biometric information can be selected, thereby primarily preventing the transmitted biometric information from being exposed. Further, in various embodiments, even though the transmitted biometric information is exposed to an unauthorized third party over a network, the third party would not be able to obtain personal information on the individual because the transmitted biometric information does not have that personal information. That is, even though the user exposes his or her biometric information to the mobile device of the affiliate member, the user's personal information is not exposed.

In step 203, information indicating whether the transmitted biometric information matches the biometric information of the user stored in the mobile device of the user is received from the mobile device of the user. The transmitted biometric information is data sensed by the mobile device of the affiliate member, and the biometric information stored in the mobile device of the user is data pre-stored by the user. If the two data match, a financial transaction may be carried out using personal information and financial information pre-stored along with the biometric information in the mobile device of the user as an entity for the financial transaction. For example, if a user A allows the mobile device of the affiliate member to sense fingerprint information of the user A, and the user A inputs his or her mobile device number, the mobile device of the affiliate member may transmit the sensed information to the mobile device of the user A to verify whether the sensed biometric information matches the pre-stored biometric information of the user A. If the sensed biometric information matches the pre-stored biometric information of the user A (step 204), the mobile device of the user A may transmit a match result to the mobile device of the affiliate member. This implies that the biometric information is authenticated to allow a financial payment to be made using personal information and financial information (e.g., credit card information or the like) of the user A pre-stored in the mobile device of the user A.

If the biometric information stored in the mobile device of the user A does not match the biometric information sensed by the mobile device of the affiliate member (step 204), the financial payment is terminated without a further progress. In other words, the financial payment may not be made using the personal information and financial information of the user A stored in the mobile device of the user A.

If the biometric information stored in the mobile device of the user A matches the biometric information sensed by the mobile device of the affiliate member (step 204), payment content is authenticated in step 205. The payment content refers to details of the payment that are generated for the authenticated user. For example, if a user A, who wants to pay his or her a lunch order for KRW 8,000 at a restaurant (affiliate member), puts his or her fingerprint on a mobile device of the restaurant and inputs his or her mobile device number, payment content is generated to allow the user A to pay KRW 8,000 for the lunch by using credit card information pre-stored in the mobile device of the user A.

In step 206, the payment content is processed in a payment method preset in the user's mobile device. The user may preset one or more payment means in the user's mobile device, for financial transactions, and make a payment by a selected one of the payment means. The user may set a basic payment means, or each time a financial transaction is carried out, the user may view a payment means list, select a payment means, and set the selected payment means. In various embodiments, financial payment methods may be displayed and selected under various conditions to maximize user convenience. Once the user pre-registers one or more payment methods in the user's mobile device, various display methods and input methods for selection, which are not described herein, may be used and actually implemented.

In various embodiments, various payment methods may be performed. The payment methods may include general payment by card, real-time account transfer, non-real-time account transfer, payment by mobile phone, payment by pre-paid on-line certificate, payment by rechargeable certificate, payment by points, and the like. A plurality of types of payment may be preset to provide an appropriate payment method according to a mobile device of an affiliate and a mobile device of a user.

According to an embodiment, the predetermined payment method may perform authentication using a substitute key for a specific payment means selected from among one or more payment means by the user. A substitute key corresponds to a unique password of the specific payment means, which is preset by the user and stored in the mobile device of the user. Specifically, the substitute key is preset in correspondence with the respective digits of the user's password among a combination of input keys displayed on the mobile device of the affiliate member. For example, a user A may store all information (a card number, an expiration date, and the like) required to pay by a credit card as a payment means in the mobile device of the user A. If the password of the credit card is 1234, the password has been preset between the user A and a credit card company to allow the user A to use the credit card. The user A may set a key substituting for each digit of the card password on his or her own. For example, a substitute key for the numeral 1 in the first digit may be a special character '?,' a substitute key for the numeral 2 in the second digit may be a special character '@,' and a substitute key for the numeral 3 in the third digit may be an English letter 'f' (lower case). Numbers, English alphabets, special characters, and Korean vowels or consonants, which are available as substitute keys are exposed on a general keyboard. For example, a Hangeul-Dubeolsik keyboard (106 keys) is configured, which may be used in various embodiments. In another example, payment by mobile phone may be made. The user may preset a password and use a substitute key that corresponds to the password. Further, for payment by mobile phone, a mobile phone number may be input. Further, as the resident registration number of the individual is input, payment may be made, even when a mobile phone number is changed, with the changed mobile phone number. In this case, all cards registered with the resident registration number are available as payment means. If there are various payment means, various embodiments may be implemented to allow payment content to be also processed by new payment means. Likewise, a substitute key may be set for a password used for a corresponding payment means. The password may be input to the mobile device of the affiliate member, and authenticated in the mobile device of the user.

Accordingly, in an embodiment, since the user uses a substitute key, exposure of the password of the user's credit card to the mobile device of the affiliate member may be prevented. This may be a user-specified security system, not a particular encryption scheme. Accordingly, even though a hacker or the affiliation member obtains the substitute key, the hacker or the affiliation member should hack the substitute key matching the card password stored in the mobile device of the user in order to obtain a number that corresponds to the substitute key. Therefore, the security level for personal information protection is very high.

In an embodiment, the user may pre-store one or more payment methods, and make each financial payment in a selected one of the plurality of payment methods. The one or more payment methods may be selected based on discount or non-discount for a payment amount, a discount percentage, point accumulation or non-accumulation, accumulated points, inclusion or non-inclusion as a record of card payment, the sum of amounts paid by card, or the like. A default value may be preset for priority based on the mobile device of the affiliate member and the features of a payment means. For example, a mobile device of a specific affiliate member may offer 10% off the price of a meal for payment by a credit card P in a restaurant. When the user intends to make a payment on the mobile device of the affiliate member according to this feature, if the user has the credit card P as a payment means, a discount for the card may be applied and the resulting price may be displayed. For various features such as cash back saving, point accumulation, point use, and the like, a discount and point accumulation/available details for payment may automatically be displayed for each payment means. Herein, the highest discount percentage or an offer of accumulation of a highest point has priority.

Further, the user may prioritize reference conditions in advance, and determine the best payment method calculated based on priority levels to be a payment means. The priority levels may be reflected adaptively in payment content in each financial payment. For example, if a specific restaurant offers 30% off the total amount of meals paid by the credit card P, the user may preset this condition as priority, and if a payment is made in the restaurant, the credit card P may be selected and the payment is made with the credit card P. In the case where the credit card P offers a high discount for a paid amount, but the user assigns higher priority to the sum of amounts paid by card, if a card Q has a very small sum of paid amounts (statement balance), the card Q may be selected and payment may be made with the card Q. The user may freely prioritize the payment methods under various conditions in advance.

In an embodiment, the mobile device of the affiliate member may constitute a list and display the list of payment methods of the user, and prompt the user to directly select and determine a payment means. In various embodiments, the user may pre-store a payment method as financial information in the user's mobile device.

Figure 3:
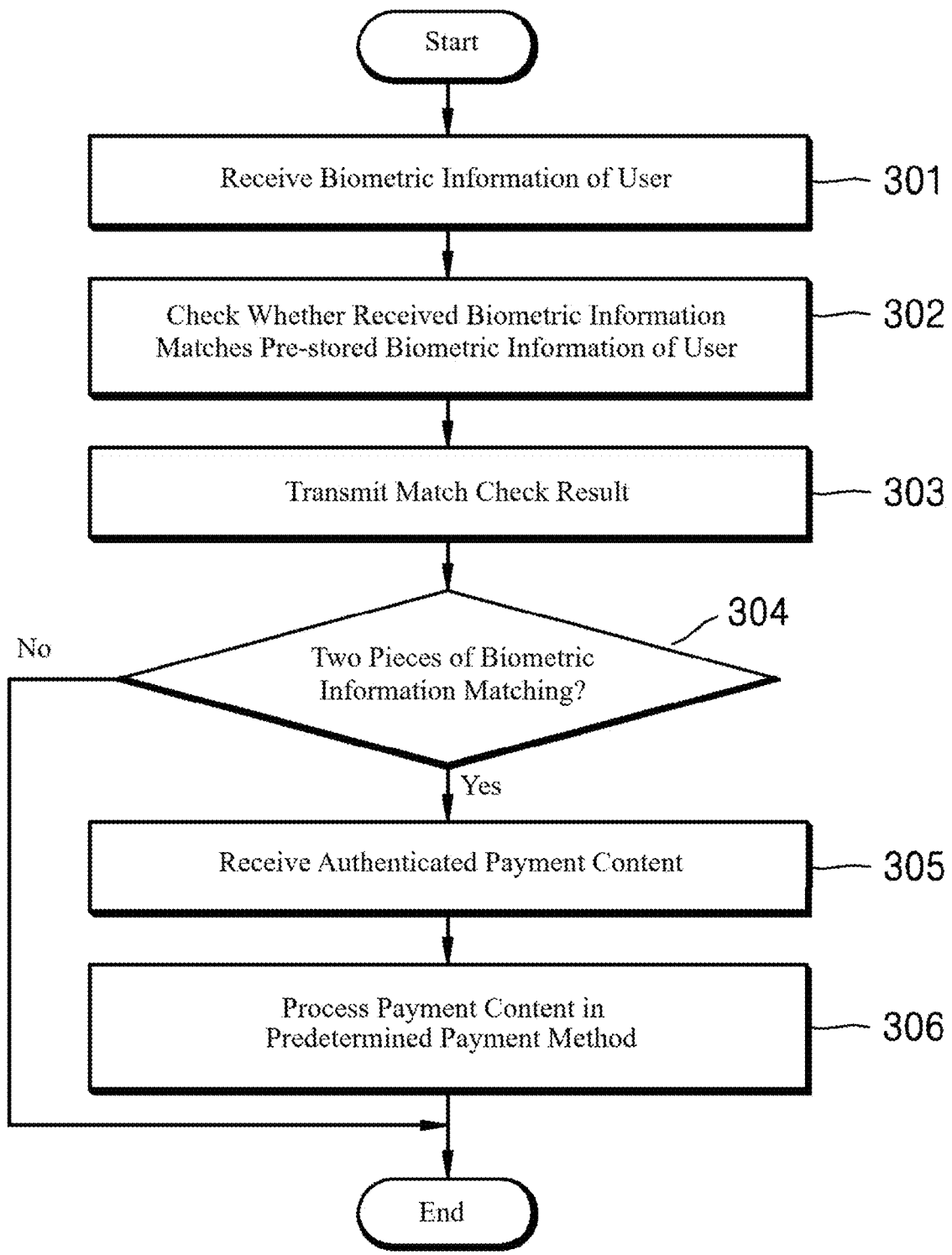
FIG. 3 is a flowchart illustrating a method of processing a financial payment by verifying payment information of an affiliate member according to an embodiment.

FIG. 3 is a flowchart illustrating a method of processing a financial payment by verifying payment information of an affiliate member according to an embodiment. When the mobile device of the user verifies payment information of the affiliate member and makes a financial payment, the following steps may be performed.

In step 301, biometric information of the user is received from the mobile device of the affiliate member (referred to as a 'first mobile device'). The user's biometric information refers to data that the user allows a sensor provided in the mobile device of the affiliate member to sense. The biometric information may be one of a fingerprint, an iris, a vein in a specific body part, an electrocardiogram, voice, and the like. Based on various types of biometric information, there may be various file formats for the biometric information. A file type is not limited based on the type of biometric information. Fingerprint information may be generated and received in an image file or a video file. The type of biometric information and the format of a file that carries the biometric information may also be preset in the user's mobile device by the user. This step corresponds to step 202 of FIG. 2.

In step 302, it is determined whether the received biometric information matches biometric information of the user pre-stored in the mobile device of the user (referred to as a 'second mobile device'). To verify whether the two data match, if the received biometric information has been encrypted, the received biometric information may be decrypted. If the received biometric information is in a specific file format, the received biometric information may be converted to a different format, when needed. Further, the scope of verification for determining match or mismatch between the two pieces of biometric information may include verifying the type of the biometric information (e.g., fingerprint information or iris information), and the file format of the received biometric information (e.g., an image file or a video file). For example, a user A may set the fingerprint of the left ring finger in a mobile device of the user A, for use as biometric information, and set that received information should be in a video file converted from an image file. If the received biometric information is a voice file, it may be determined that the two pieces of biometric information do not match. If the received biometric information is a video file, the video file may be converted to an image file and compared with the fingerprint of the left ring finger stored in the user's mobile device. Before step 302, a step of receiving one or more pieces of biometric information from the user of the user's mobile device in embodiments. The received biometric information may be stored in a DB of the user's mobile device. If biometric information is received from the mobile device of the affiliate member, the received biometric information may be compared with the stored biometric information.

One or more pieces of biometric information may be selected in combination. Once the user pre-stores the selected biometric information in the user's mobile device, the user may use the registered biometric information in subsequent financial payments. Since the user merely stores the biometric information in the user's mobile device without transmitting or storing data to or in the mobile device of the affiliate member, the biometric information requiring personal information protection may be protected sufficiently.

In step 303, the verification result of step 302 is transmitted to the mobile device of the affiliate member. If the received biometric information matches the biometric information stored in the mobile device of the user, the procedure goes from step 304 to step 305 (Yes), and the financial payment is processed. If the two pieces of biometric information do not match, the procedure ends (No) in step 304.

In step 305, when the two pieces of biometric information match, authenticated payment content is received from the mobile device of the affiliate member. The payment content includes information on an amount that the user owes the affiliate member.

In step 306, the received payment content is processed in a payment method preset in the mobile device of the user. Specifically, the payment is processed in a payment method selected from among one or more payment methods. The payment methods may include various online payment methods such as payment by card, payment by mobile phone, account transfer, and the like. Before step 306, a step of receiving information on one or more payment methods from the user of the user's mobile device may be performed. Various payment methods are available, and a plurality of items may also be available for each payment type. For example, 3 different types of credit cards may be registered, 2 different bank accounts may be registered, and a mobile phone authentication procedure may be performed in advance for payment by mobile phone. For payment by card, the user should pre-input information for payment (e.g., a card number, a card expiration date, and the like). Herein, the user may set a substitute key that corresponds to a card password.

If the user inputs the card password through the mobile device of the affiliate member, the user's password may be exposed to the mobile device of the affiliate member, and the user's password may be exposed on the network during transmission to the mobile device of the user. To prevent the exposure, a substitute key for the card password may be input to the mobile device of the affiliate member, and the mobile device of the affiliate member may transmit the substitute key to the mobile device of the user. Therefore, the card password is verified between the mobile device of the user and the card company server, and thus the security measure may be extended.

A substitute key is set to allow a key from a set of input keys displayed on the mobile device of the affiliate member (or the mobile device of the user) to correspond to each digit of the password according to a user input. The mobile device of the user may store substitute key information that corresponds to a password for each card.

Therefore, when a card password is verified between the mobile device of the affiliate member and the mobile device of the user, using a substitute key, the mobile device of the user may request card payment to the card company server. Subsequently, the card company may accept the request and approve the use of the card for sales of the affiliate member.

An embodiment of the financial payment method of the mobile device 100 of the affiliate member has been described with reference to FIG. 2, and an embodiment of the financial payment method from the perspective of the mobile device 200 of the user has been described with reference to FIG. 3. FIG. 4 is a sequence diagram that illustrates interaction among the mobile device 200 of the user, the mobile device 100 of the affiliate member, and a card company server 500, to give a detailed description of interaction between the two mobile devices.

In step S401, the user may register his or her biometric information in the mobile device 200 of the user, store personal information (a name, a date of birth, a residence registration number, and the like), and set one or more payment methods as financial information. Herein, a user-set substitute key may be stored for a password for a specific payment means. The mobile device 200 of the user may authenticate the biometric information and process a payment in the stored payment method.

In step S402, the mobile device of the affiliate member transmits sensed biometric information to the mobile device of the user. In Step S403, the mobile device of the user determines whether the received biometric information matches the pre-stored biometric information. In step S404, the mobile device of the user transmits the determination result to the mobile device of the affiliate member.

In step S405, if the received biometric information matches the biometric information stored in the mobile device of the user, the mobile device of the affiliate member authenticates payment content for the financial payment. In step S406, the mobile device of the affiliate member receives the substitute key that corresponds to the password of the payment means from the user in order to process the payment in the preset payment method, and the mobile device of the affiliate member transmits the substitute key to the mobile device of the user. In step S407, the mobile device of the user verifies whether the substitute key matches the card password. In step S408, the mobile device of the affiliate member transmits the verification result to the mobile device of the affiliate member.

In step S409, if the substitute key matches the card password, the mobile device of the affiliate member transmits the payment content to the mobile device of the user to request the payment.

In step S410, the mobile device of the user requests payment approval to the card company server 500 in the user-preset payment method. While substitute key information is transmitted and received between the mobile device of the user and the mobile device of the affiliate member, a credit card password may be transmitted and received directly between the mobile device of the user and the card company server. In this case, a security measure can be provided by the card company server.

In step S411, regarding the payment content, the card company server 500 may approve the payment to the mobile device of the user.

The mobile device of the affiliate member is not able to know all of personal information, biometric information, and financial information of a user. The mobile device of the affiliate member obtains only sensed biometric information and substitute key information. The biometric information of a user itself does not mean a lot. It has to be combined with personal information of the user to be meaningful in electronic transactions. Therefore, even when a user exposes his or her fingerprint to the mobile device of the affiliate member, it may not create a security problem in electronic transactions. On the contrary, since the personal information, biometric information, and financial information of the user may be stored in the mobile device of the user, and user authentication and card authentication are performed for each financial payment in the mobile device of the user, a high level of security can be achieved. On the other hand, the card company server processes payment directly with the mobile device of the user based on card information of a specific person, and thus the security system may be maintained in a more organized manner than when processing with a plurality of devices of multiple affiliate members.

Figure 5A:
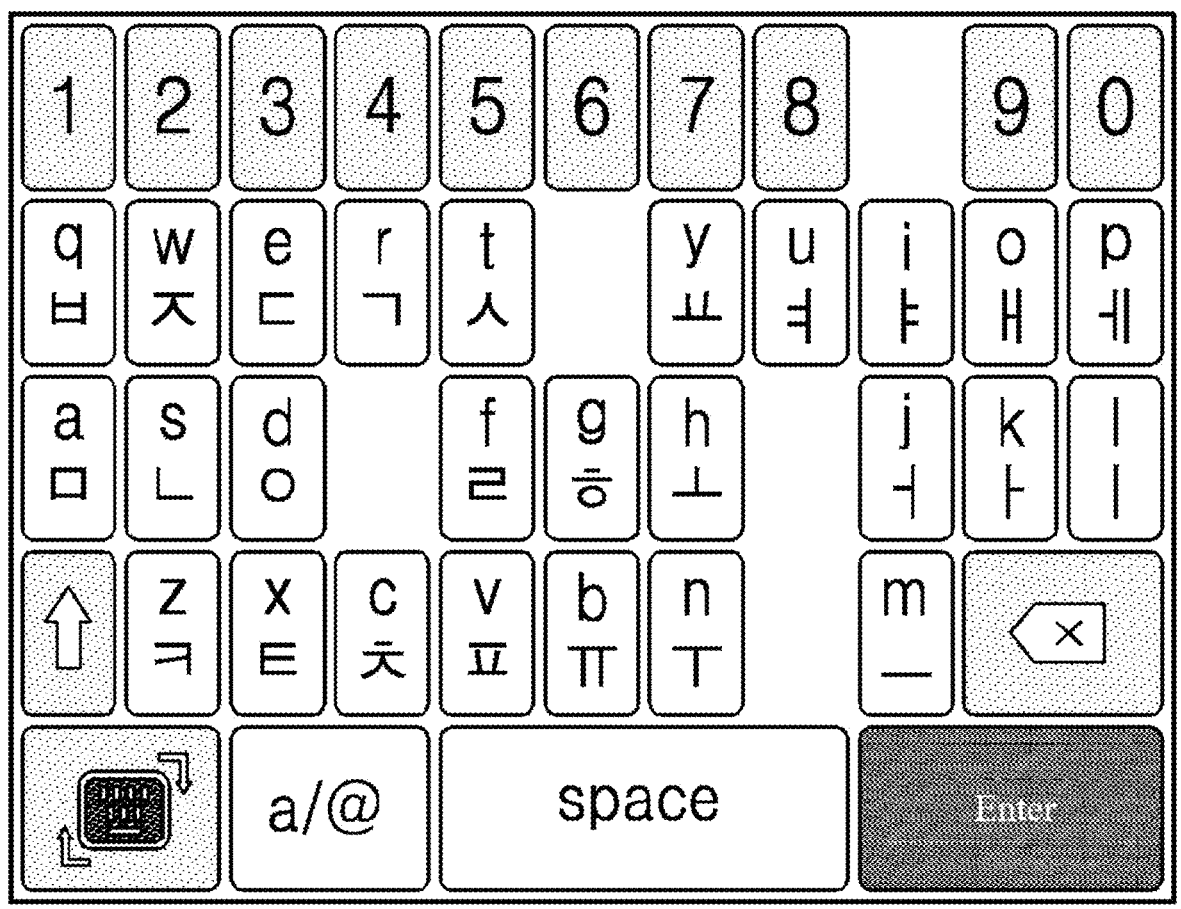
FIGS. 5A and 5B illustrate exemplary keypads for inputting a substitute key, displayed on a mobile device according to an embodiment.
Figure 5B:
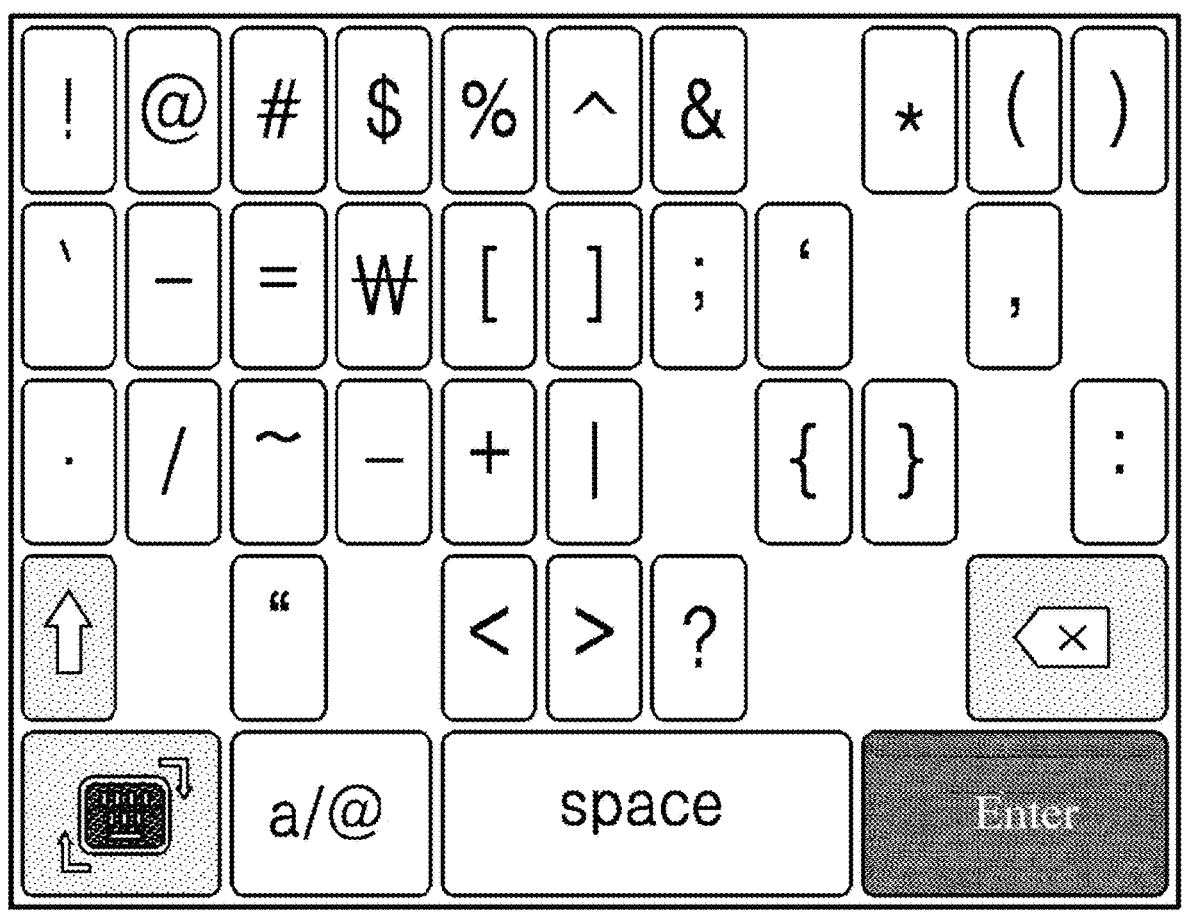

FIGS. 5A and 5B are exemplary keypads displayed on a mobile device to allow a user to input a substitute key, according to embodiments of the present disclosure. The keypad of FIG. 5A includes numbers, English alphabets, Korean vowels, and Korean consonants, and the keypad of FIG. 5B includes special characters. For security, input keys are arranged with spaces in the keyboard layout of an actual keypad. For example, a space is interposed between numbers 8 and 9. The mobile device of the affiliate member may provide a display screen as illustrated in FIG. 5A to the user to allow the user to input a substitute key.

Figure 6:
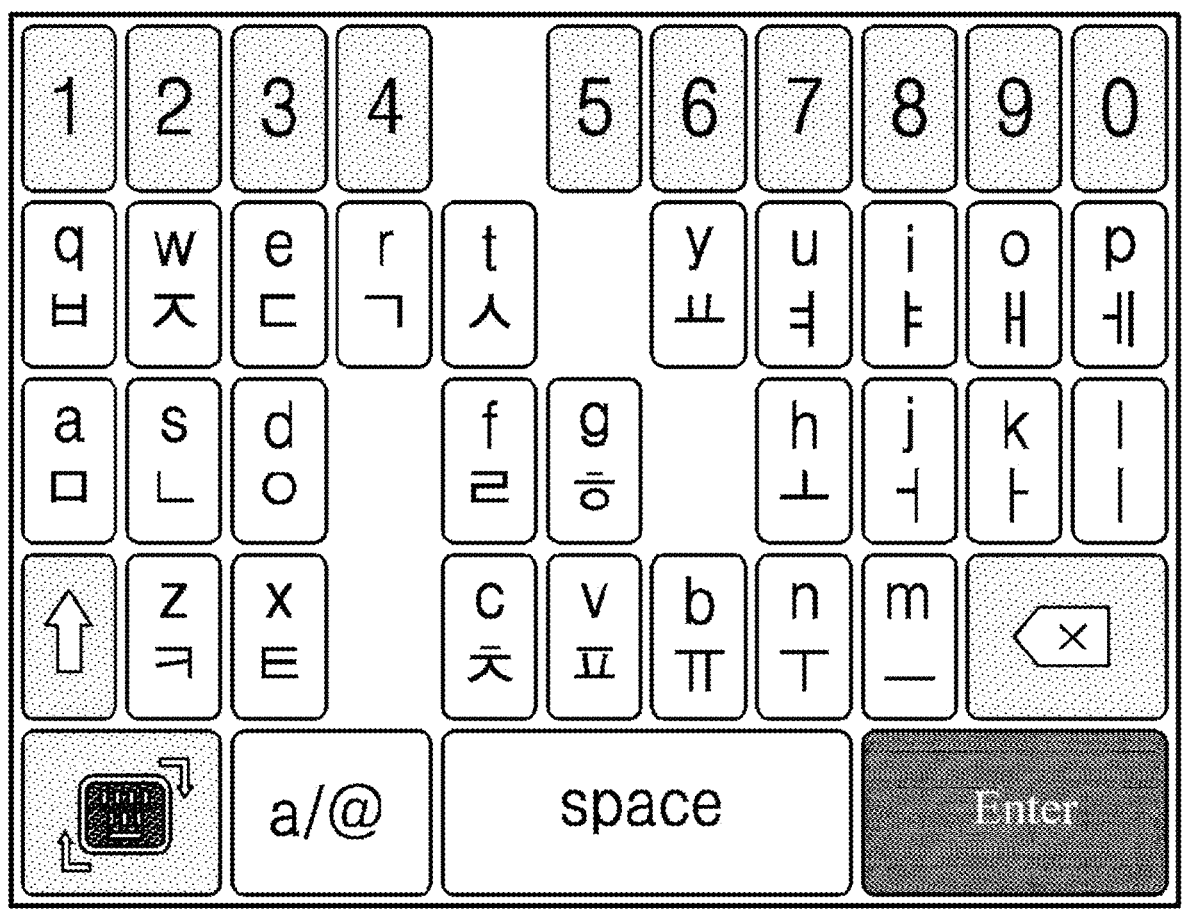
FIG. 6 illustrates an exemplary keypad on which the keys of the keypad illustrated in FIG. 5A are rearranged each time one digit of a substitute key is input according to an embodiment.

In an embodiment, the user may input, on a mobile device of an affiliate member, a substitute key that corresponds to a password of a payment means. Each time the user inputs each digit of the substitute key, the combination of input keys illustrated in FIG. 5A or FIG. 5B may be re-ordered. To further improve security, for a 4-digit substitute key, 4 different types of keyboards may be provided. FIG. 6 illustrates an example that the keyboard illustrated in FIG. 5A is re-ordered each time when each digit of a substitute key is input. Compared to FIG. 5A in which a space exists between numbers 8 and 9, there is no space between numbers 8 and 9 in FIG. 6. While there is no space between numbers 4 and 5 in FIG. 5A, the keys are re-ordered such that there is a space between numbers 4 and 5 in FIG. 6.

The above-described embodiments may be implemented in hardware, software, and/or a combination thereof. For example, the apparatuses, methods, and components described in the embodiments may be implemented using one or more general-purpose computers or special-purpose computers, such as a processor, a controller, an ALU (arithmetic logic unit), a digital signal processor, a microcomputer, an FPGA (field programmable gate array), a PLU (programmable logic unit), a microprocessor, or any other device capable of executing an instruction and responding. A processing device may execute an operating system (OS) and one or more software applications executed on the OS. Further, the processing device may access, store, manipulate, process, and generate data in response to execution of software. To help understanding, the processing device is described as a single one. However, those skilled in the art will understand that the processing device may include a plurality of processing elements and/or a plurality of types of processing elements. For example, the processing device may include a plurality of processors, or one processor and one controller. Further, a different processing configuration such as a parallel processor is available.

Software may include a computer program, a code, an instruction, or a combination of two or more thereof, and may configure a processing device so that the processing device may operate in a desired manner or instruct the processing device independently or collectively. Software and/or data may be embodied permanently or temporarily in some type of machine, component, physical device, virtual equipment, computer storage medium or device, or a transmitted signal wave in order to be interpreted by the processing device or provide an instruction or data to the processing device. The software may be distributed over computer systems connected via a network, and stored or executed in a distributed manner. The software and data may be stored in one or more computer-readable recording mediums.

A method according to an embodiment may be implemented in the form of a program instruction executable by various computer means and recorded in a computer-readable medium. The computer-readable medium may include a program instruction, a data file, and a data structure alone or in combination. The program instruction recorded in the medium may be specially designed and configured for the embodiment, or known and thus available to those skilled in computer software. The computer-readable medium may include hard disk, floppy disk, magnetic media such as magnetic tape, optical media such as CD-ROM and DVD, magneto-optical media such as floptical disk, and a hardware device specially configured to store and execute a program instruction such as ROM, RAM, and flash memory. Program instructions may include machine language code that is produced by a compiler or high-level language code that may be executed by an interpreter. The hardware device may be configured to operate as one or more software modules or vice versa in order to perform operations in the embodiment.

While the embodiments have been described above with reference to the particularly embodiment and the drawings, those skilled in the art will understand that various modifications and variations can be made from the disclosure. For example, even though the above-described techniques may be implemented in a different order from that described and/or the described components such as a system, structure, device, circuit, and so on are combined or merged in a method other than the described method or replaced by other components or equivalents, appropriate results may be achieved. Accordingly, other implementations, other embodiments, the appended claims, and their equivalents fall within the scope of the appended claims.

FIG. 7 is a block diagram of an identity authentication system according to an exemplary embodiment of the present disclosure.

Referring to FIG. 7, an identity authentication system 1 may include an identity authentication device 100, an identity authentication request device 200, and a server 300.

The identity authentication device 100 may perform identity authentication by comparing pre-stored biometric information (or first data) of a user and sensing information (or second data) of the user received from the identity authentication request device 200.

The server 300 may receive personal information of the user from the identity authentication device 100 and store the personal information. Also, the server 300 may extract the biometric information (or the first data) from the sensing information (or the second data) of the user received from the identity authentication request device 200 and match the biometric information (or the first data) to the pre-stored personal information (e.g., identification information) of the user. For example, the identification information may be any one of a telephone number and a personal identification number (PIN) for identifying the identity authentication device 100 in which the biometric information (or the first data) of the user is stored.

The identity authentication request device 200 may transmit the sensing information (or the second data) of the user to the identity authentication device 100 which is identified on the basis of the personal information of the user received from the server 300.

The identity authentication device 100 may perform identity authentication on the user by comparing the biometric information (or the first data) stored in the identity authentication device 100 and the sensing information (or the second data) obtained by the identity authentication request device 200.

For example, the identity authentication device 100 may be a portable electronic device of the user, and the identity authentication request device 200 may be an electronic device provided in a member store of a provider of a service that the user wants to use. The service that the user wants to use varies, and the electronic device related to the service may be present in various forms.

According to the exemplary embodiment of the present disclosure, the identity authentication device 100 may include a wireless communication circuit 110, a processor 120, a memory 130, an input/output device 140, a camera module 150, and a sensor module 160.

The wireless communication circuit 110 may set communication between the identity authentication device 100 and an external device (e.g., the identity authentication request device 200 or the server 300). Wireless communication may include cellular communication which employs at least one of, for example, Long Term Evolution (LTE), LTE Advanced (LTE-A), code division multiple access (CDMA), wideband CDMA (WCDMA), universal mobile telecommunications system (UMTS), wireless broadband (WiBro), and global system for mobile communications (GSM). According to an exemplary embodiment, wireless communication may employ at least one of, for example, Wi-Fi, Bluetooth, Bluetooth low energy (BLE), ZigBee, near field communication (NFC), magnetic secure transmission, radio frequency (RF), and a body area network (BAN). According to an exemplary embodiment, wireless communication may employ a global navigation satellite system (GNSS). The GNSS may be, for example, the global positioning system (GPS), the Global Navigation Satellite System (GLONASS), the BeiDou navigation satellite system, or Galileo, the European global satellite-based navigation system.

The processor 120 may include one or more of a central processing unit (CPU), an application processor, and a communication processor (CP). The processor 120 may perform, for example, computation or data processing for control of and/or communication with at least one of other components of the identity authentication device 100.

The memory 130 may include a volatile memory and/or a non-volatile memory. The memory 130 may store, for example, instructions or data related to at least one of other components of the identity authentication device 100. According to an exemplary embodiment, the memory 130 may store software and/or programs. The programs may include, for example, a kernel, middleware, an application programming interface (API), and/or an application program (or "application"). The memory 130 may include, for example, an internal memory or an external memory. The internal memory may include at least one of, for example, a volatile memory (e.g., a dynamic random access memory (DRAM), a static RAM (SRAM), or a synchronous dynamic RAM (SDRAM)), a non-volatile memory (e.g., a one-time programmable read-only memory (OTPROM)), a programmable ROM (PROM), an erasable programmable ROM (EPROM), an electrically erasable programmable ROM (EEPROM), a mask ROM, a flash ROM, a flash memory, a hard drive, and a solid state drive (SSD). The external memory may include a flash drive, for example, a CompactFlash (CF), a Secure Digital (SD), a micro-SD, a mini-SD, an extreme Digital (xD), a multi-media card (MMC), a memory stick, or the like. The external memory may be functionally or physically connected to the identity authentication device 100 through one of various interfaces.

The input/output device 140 may include, for example, a touch panel, a (digital) pen sensor, a key, an ultrasonic input device, a display, or an audio module. The touch panel may be at least one of, for example, capacitive, resistive, infrared, and ultrasonic types. The (digital) pen sensor may be a part of the touch panel or may include a separate recognition sheet by way of example. The key may include, for example, a hardware button, an optical key, or a keypad. The ultrasonic input device may detect ultrasonic waves generated by an input tool through a microphone to acquire data corresponding to the detected ultrasonic waves. The display may include a panel, a hologram device, a projector, and/or a control circuit for control thereof. The panel may be implemented to be, for example, flexible, transparent, or wearable. According to an exemplary embodiment, the panel may include a pressure sensor (or force sensor) which may measure the intensity of a user's touch pressure. The hologram device may display a stereoscopic image in the air using the interference of light. The projector may project light onto a screen to display an image. The screen may be positioned, for example, inside or outside the identity authentication device 100. The audio module may convert, for example, a sound into an electrical signal or vice versa. The audio module may process sound information input or output through, for example, a speaker, a receiver, an earphone, a microphone, or the like.

The camera module 150 is, for example, a device which may capture a still image or a video. According to an exemplary embodiment, the camera module 150 may include one or more image sensors (e.g., a front sensor or a rear sensor), a lens, an image signal processor (ISP), or a flash (e.g., a light-emitting diode (LED) or a xenon lamp).

The sensor module 160 may, for example, measure a physical quantity or sense an operation state of the identity authentication device 100 and convert the measured or sensed information into an electrical signal. The sensor module 160 may include, for example, a sound sensor, a gesture sensor, a biometric sensor, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 160 may further include a control circuit for controlling one or more sensors included therein. In some exemplary embodiments, the identity authentication device 100 may further include a processor configured to control the sensor module 160 as a part of the processor 120 or separately from the processor 120 while the processor 120 is a sleep state.

In various embodiments of the present disclosure, the identity authentication device 100 may include the wireless communication circuit 110, the at least one processor 120 electrically connected to the wireless communication circuit 110, and the memory 130 electrically connected to the at least one processor 120.

The memory 130 may include biometric information (or first data) of users and information on the identity authentication request device 200.

For example, the biometric information (or the first data) of the users may include at least one of face information, voice information, fingerprint information, deoxyribonucleic acid (DNA) information, body skeleton information, hand shape information, retina information, iris information, vein information, ECG information, handwriting information, gait information, signature information, blood vessel information, sweat gland structure information, and biomolecule information.

For example, the information on the identity authentication request device 200 may include at least one of, for example, types of services related to the identity authentication request device 200, details of the services related to the identity authentication request device 200, the location of the identity authentication request device 200, the type of the identity authentication request device 200, and sensor information included in the identity authentication request device 200.

According to the exemplary embodiment of the present disclosure, the camera module 150 or the sensor module 160 may be included, and the at least one processor 120 may acquire the biometric information (or the first data) of the user on the basis of sensing data (or the second data) obtained by sensing the user's body through the camera module 150 or the sensor module 160 and store the biometric information (or the first data) of the user in a secure region of the memory 130.

According to the exemplary embodiment of the present disclosure, the at least one processor 120 may install an application related to the identity authentication request device 200 in response to a selection of the user and store the information on the identity authentication request device 200 in the memory 130.

The at least one processor 120 may acquire data about one or more pieces of information, which are required by the identity authentication request device 200 through an application, using the input/output device 140 and transmit the one or more pieces of information acquired by the wireless communication circuit 110 to the identity authentication request device 200.

For example, the at least one processor 120 may receive sensing information (or the second data) from the identity authentication request device 200 using the wireless communication circuit 110 and determine whether the received sensing information (or the second data) corresponds to biometric information (or the first data). The at least one processor 120 may transmit information on whether the sensing information (or the second data) of the user corresponds to the biometric information (or the first data) of the user to the identity authentication request device 200 using the wireless communication circuit 110.

According to the exemplary embodiment of the present disclosure, the identity authentication request device 200 may include a wireless communication circuit 210, a processor 220, a memory 230, an input/output device 240, a sensor module 260, and a camera module 250.

The wireless communication circuit 210 may set communication between the identity authentication request device 200 and an external device (e.g., the identity authentication device 100 or the server 300). The wireless communication circuit 210 may be implemented the same as the wireless communication circuit 110 of the identity authentication device 100.

The processor 220 may include one or more of a CPU, an application processor, and a CP. The processor 220 may perform, for example, computation or data processing for control of and/or communication with at least one of the other components of the identity authentication request device 200.

The memory 230 may include a volatile memory and/or a non-volatile memory. The memory 230 may store, for example, instructions or data related to at least one of the other components of the identity authentication request device 200. According to an exemplary embodiment, the memory 230 may store software and/or programs. The programs may include, for example, a kernel, middleware, an API, and/or an application program (or "application"). The memory 230 may include, for example, an internal memory or an external memory. The internal memory may include at least one of, for example, a volatile memory (e.g., a DRAM, an SRAM, or an SDRAM), a non-volatile memory (e.g., an OTPROM), a PROM, an EPROM, an EEPROM, a mask ROM, a flash ROM, a flash memory, a hard drive, and an SSD. The external memory may include a flash drive, for example, a CF, an SD, a micro-SD, a mini-SD, an xD, an MMC, a memory stick, or the like. The external memory may be functionally or physically connected to the identity authentication request device 200 through one of various interfaces.

The input/output device 240 may include, for example, a touch panel, a (digital) pen sensor, a key, an ultrasonic input device, a display, or an audio module. The touch panel may be at least one of, for example, capacitive, resistive, infrared, and ultrasonic types. The (digital) pen sensor may be a part of the touch panel or may include a separate recognition sheet by way of example. The key may include, for example, a hardware button, an optical key, or a keypad. The ultrasonic input device may detect ultrasonic waves generated by an input tool through a microphone to acquire data corresponding to the detected ultrasonic waves. The display may include a panel, a hologram device, a projector, and/or a control circuit for control thereof. The panel may be implemented to be, for example, flexible, transparent, or wearable. According to an exemplary embodiment, the panel may include a pressure sensor (or force sensor) which may measure the intensity of the user's touch pressure. The hologram device may display a stereoscopic image in the air using the interference of light. The projector may project light onto a screen to display an image. The screen may be positioned, for example, inside or outside the identity authentication request device 200. The audio module may convert, for example, a sound into an electrical signal or vice versa. The audio module may process sound information input or output through, for example, a speaker, a receiver, an earphone, a microphone, or the like.

The camera module 250 is, for example, a device which may capture a still image or a video. According to an exemplary embodiment, the camera module 250 may include one or more image sensors (e.g., a front sensor or a rear sensor), a lens, an ISP, or a flash (e.g., an LED or a xenon lamp).

The sensor module 260 may, for example, measure a physical quantity or sense an operation state of the identity authentication request device 200 and convert the measured or sensed information into an electrical signal. The sensor module 260 may include, for example, a gesture sensor, a biometric sensor, an e-nose sensor, an EMG sensor, an EEG sensor, an ECG sensor, an IR sensor, an iris sensor, and/or a fingerprint sensor. The sensor module 260 may further include a control circuit for controlling one or more sensors included therein. In some exemplary embodiments, the identity authentication request device 200 may further include a processor configured to control the sensor module 260 as a part of the processor 220 or separately from the processor 220 while the processor 220 is a sleep state.

According to the exemplary embodiment of the present disclosure, the at least one processor 220 may acquire sensing information (or the second data) obtained by sensing the user's body through the sensor module 260 or the camera module 250. Here, the sensing information (or the second data) of the user may be biometric information (or the first data) of the user which is unprocessed raw data.

For example, the sensing information (or the second data) of the user may include an image file, a voice file, an electronic document, and the like. In other words, sensing information (or the second data) corresponding to biometric information (or the first data), such as face information, fingerprint information, body skeleton information, hand shape information, iris information, handwriting information, signature information, and sweat gland structure information, may be image files, and sensing information (or the second data) corresponding to biometric information (or the first data), such as a voice speaking a specific word, sentence, name, etc., a whistling sound, a cough sound, may be voice files. Also, sensing information (or the second data) corresponding to biometric information (or the first data), such as vein information, ECG information, ECG information, and blood vessel information, may be in the form of electronic documents.

The at least one processor 220 may transmit the sensing information (or the second data) of the user to the server 300 using the wireless communication circuit 210 and acquire identification information, such as a phone number, of the identity authentication device 100 from the server 300. Also, the at least one processor 220 may transmit the sensing information (or the second data) of the user to the identified identity authentication device 100 and receive authentication data from the identity authentication device 100 using the wireless communication circuit 210. The at least one processor 220 may perform a predetermined function on the basis of the authentication data or output an authentication failure message through the input/output device 240.

The memory 230 may not store the sensing information (or the second data) of the user. For example, the at least one processor 220 may receive the authentication data from the identity authentication device 100 and then permanently delete the sensing information (or the second data) of the user in the memory 230.

The server 300 according to the exemplary embodiment of the present disclosure may include a biometric information extractor 310, a matcher 320, and a database 330.

The biometric information extractor 310 may receive sensing information (or the second data) of the user from the identity authentication request device 200 and extract the biometric information (or the first data) of the user from the received sensing information (or the second data) of the user through machine learning. As described above, the sensing information (or the second data) of the user may include an image file, a voice file, an electronic document, and the like. As an example, a case in which the sensing information (or the second data) of the user is in the form of an image file will be described below for convenience of description.

According to the exemplary embodiment of the present disclosure, the sensing information (or the second data) of the user may be an image obtained by capturing the user's face. The image may be in one file format among BMP, JPG (JPEG), GIF, EPS, TIF (TIFF), PSD, PIC, DXF, PP3, PICT, PNG, desktop color separations (DCS), FlashPix, PCX, PDF, PIXAR, Raw, Scitex CT (SCT), and Targa.

In this case, the biometric information extractor 310 may extract face information of the user from the image through machine learning. For example, the biometric information extractor 310 may extract the face information using at least one of a Haar-like algorithm and a convolutional neural network (CNN) algorithm. In other words, the biometric information extractor 310 may use an algorithm obtained by combining characteristics of the Haar-like algorithm and the CNN algorithm. The CNN algorithm exhibits excellent performance in big data processing.

According to the exemplary embodiment, the biometric information extractor 310 may extract biometric information (or first data) on the basis of cumulative machine learning data stored in the database 330 in advance. In this case, the cumulative machine learning data may be obtained by accumulating machine learning results of the biometric information extractor 310 on sensing information (or second data). The cumulative machine learning data may include only features of images for determining which user corresponds to a face extracted from an arbitrary image. In other words, the cumulative machine learning data does not function alone as biometric information (or first data) but may be information for determining who is a user requesting identity authentication from the image received from the identity authentication request device 200.

The matcher 320 may select personal information (e.g., identification information) of the user corresponding to the biometric information (or the first data) of the user extracted through the biometric information extractor 310 from among pieces of pre-stored personal information of a plurality of users. Also, the matcher 320 may transmit the selected personal information of the user to the identity authentication request device 200.

According to the exemplary embodiment, the matcher 320 may determine whether the biometric information (or the first data) corresponds to a certain user's personal information on the basis of a lookup table pre-stored in the database 330. Here, the lookup table may include personal information (e.g., identification information) corresponding to each of the plurality of users. For example, the lookup table may be a table in which each of the plurality of users corresponds to identification information of one of the plurality of users. For example, the identification information may be a phone number or a PIN for identifying the identity authentication device 100 in which biometric information (or first data) of a specific user is stored.

The database 330 may include personal information of each of a registered plurality of users. For example, personal information of a user may include a mobile phone number, a PIN, an identification (ID), a password, a name, a sex, an address, an e-mail address, and an identification number related to a service provided by the identity authentication request device 200.

According to the exemplary embodiment of the present disclosure, the database 330 may store cumulative data which is a machine learning result from the sensing information (or the second data) of the user and may not store either of the biometric information (or the first data) and the sensing information (or the second data). Here, the cumulative data may be updated every time the biometric information extractor 310 performs machine learning on an image received from the identity authentication request device 200.

Also, the database 330 may include a lookup table in which the name of the user is matched to identification information (e.g., a mobile phone number) for identifying the identify authentication device 100 storing the biometric information (or the first data) of the user.

FIG. 8 is a flowchart illustrating a method of performing identity authentication by an identity authentication device according to an exemplary embodiment of the present disclosure. The identity authentication device 100 may perform identity authentication by checking sensing information (or second data) received from the identity authentication request device 200.

Referring to FIGS. 1 and 2, in operation 201, the identity authentication device 100 may store biometric information (or first data) of a user in the memory 130 on the basis of data obtained by sensing the user's body. The biometric information (or the first data) may include at least one of face information, voice information, fingerprint information, DNA information, body skeleton information, hand shape information, retina information, iris information, vein information, ECG information, handwriting information, gait information, signature information, blood vessel information, sweat gland structure information, and biomolecule information.

For example, the identity authentication device 100 may acquire a face image as sensing information (or second data)

by imaging the user's face through the camera module 150, extract the biometric information (or the first data) from the face image, and store the biometric information in the memory 130. Here, the biometric information (or the first data) includes a feature for distinguishing the specific user from a plurality of users. The identity authentication device 100 according to the exemplary embodiment may store information on an ID card of the user in the memory 130 together with the biometric information (or the first data) of the user. For example, the identity authentication device 100 may store one or more of ID card information, passport information, and driver's license information in the memory 130.

In operation 202, the identity authentication device 100 may acquire information on the identity authentication request device 200 according to a selection of the user. For example, the identity authentication device 100 may install an application related to the identity authentication request device 200 according to a selection of the user for using a service provided by the identity authentication request device 200.

The information related to the identity authentication request device 200 varies according to types or characteristics of the service provided by the identity authentication request device 200. The identity authentication device 100 may acquire information on the type of service provided by the identity authentication request device through the application, a sensor of the identity authentication request device 200, a camera of the identity authentication request device 200, the location of the identity authentication request device 200, a provider of the service, or use of the service.

For example, when the identity authentication request device 200 is a check-in electronic device for a hotel operator to provide accommodation services, the identity authentication device 100 may install a hotel application provided by the hotel operator according to a selection of the user for application installation.

In operation 203, the identity authentication device 100 may transmit personal information of the user excluding the biometric information (or the first data) of the user to the identity authentication request device 200 and the server 300 using the application. For example, the personal information of the user may be input to the identity authentication device 100 according to an initial manual of the application, and the identity authentication device 100 may transmit the input personal information of the user to the identity authentication request device 200 and the server 300. However, the configuration in which the personal information of the user is directly transmitted from the identity authentication device 100 to the server 300 is exemplary, and the present disclosure is not limited thereto. For example, the personal information of the user may be transmitted from the identity authentication device 100 to the server 300 via the identity authentication request device 200.

Information on the user is information requested by the identity authentication request device 200 and the server 300 and may include one or more items for an administrator (or operator), who manages a service provided by the identity authentication request device 200 and the server 300, to identity the user. For example, the information on the user may include at least one of a phone number, a PIN, an ID, a password, a name, a sex, an address, an e-mail address, an identification number (e.g., a membership registration number) related to the service provided by the identity authentication request device 200, the type of service in use, and details of the service. However, the information on the user does not include any form of biometric information (or the first data) of the user.

In operation 204, the identity authentication device 100 may receive the sensing information (or the second data) from the identity authentication request device 200 through the wireless communication circuit 110. For example, the identity authentication request device 200 may transmit data obtained by sensing the user's body through the sensor module 260 or the camera module 250 to the identity authentication device 100 so that identity authentication may be performed. The identity authentication device 100 may confirm a request for identity authentication by receiving the sensing information (or the second data) from the identity authentication request device 200. The identity authentication device 100 and the identity authentication request device 200 may set a type of biometric information (or first data) in advance. For example, the identity authentication device 100 and the identity authentication request device 200 may be set together such that the identity authentication device receives the sensing information (or the second data) (e.g., the face image) from the identity authentication request device 200 and performs identity authentication.

According to the exemplary embodiment, the identity authentication device 100 may check information on a device which transmits the sensing information (or the second data) on the basis of stored information on the identity authentication request device 200. When the device which transmits the sensing information (or the second data) differs from the pre-registered identity authentication request device 200, the identity authentication device 100 may not perform an identity authentication process. For example, the identity authentication device 100 may determine whether the identity authentication request device 200 is a pre-registered device using an identification number of the device which transmits the sensing information (or the second data).

In operation 205, the identity authentication device 100 may compare the biometric information (or the first data) of the user stored in the memory 130 with the sensing information (or the second data) received from the identity authentication request device 200 and determine whether to authenticate the user on the basis of the comparison result. When the biometric information (or the first data) and the sensing information (or the second data) of the user correspond to each other, the identity authentication device 100 may determine that the authentication is completed. In this case, the user's body sensed by the identity authentication request device 200 may be construed as corresponding to the body of a user of the identity authentication device 100. On the other hand, when the biometric information (or the first data) and the sensing information (or the second data) of the user do not correspond to each other, the identity authentication device 100 may determine that the identity authentication has failed. In this case, the user's body sensed by the identity authentication request device 200 may be construed as not corresponding to the body of the user of the identity authentication device 100.

In operation 206, the identity authentication device 100 may transmit authentication data as an authentication result determined in operation 205 to the identity authentication request device 200 using the wireless communication circuit 110. For example, the identity authentication device 100 may transmit authentication data, which is determined regarding whether the sensing information (or the second data) obtained by the identity authentication request device 200 corresponds to the user of the identity authentication device 100 on the basis of the biometric information (or the first data) of the user, to the identity authentication request device 200.

When the identity authentication is completed, the identity authentication device 100 may also transmit any one or more items predetermined in information on the user to the identity authentication request device 200. For example, the identity authentication device 100 may transmit the ID of the user to the identity authentication request device 200 together with data confirming that the identity authentication is completed. When the identity authentication fails, identity authentication device 100 may transmit data confirming that the identity authentication has failed to the identity authentication request device 200. When the identity authentication fails, the identity authentication device 100 may transmit data confirming that the identity authentication has failed to the identity authentication request device 200.

While performing the identity authentication using the biometric information (or the first data) of the user, the identity authentication device 100 according to the exemplary embodiment may also authenticate the ID card of the user. When the identity authentication is completed, the identity authentication device 100 may transmit the ID card information of the user stored in the memory 130 to the identity authentication request device 200 together with an authentication complete message. Alternatively, when the identity authentication is completed, the identity authentication device 100 may transmit a message indicating that the authentication of the ID card has been completed to the identity authentication request device 200 together with the authentication complete message.

FIG. 9 is a flowchart illustrating a method of requesting, by an identity authentication request device, identity authentication from an identity authentication device using sensing data obtained by sensing a user's body according to an exemplary embodiment of the present disclosure. The identity authentication request device 200 may transmit sensing data obtained by sensing an adjacent user's body to the identity authentication device 100 and receive data about whether the user has been authenticated.

In operation 301, the identity authentication request device 200 may receive personal information of a user of the identity authentication device 100 from the identity authentication device 100. The personal information of the user is requested by the identity authentication request device 200 and may include one or more items for an administrator (or operator), who manages a service provided by the identity authentication request device 200, to identity the user. For example, the personal information on the user may include at least one of a phone number, a PIN, an ID, a password, a name, a sex, an address, an e-mail address, an identification number (e.g., a membership registration number) related to the service provided by the identity authentication request device 200, the type of service in use, and details of the service. The identity authentication request device 200 may request the identity authentication device 100 to transmit the personal information of the user using an application.

In operation 302, the identity authentication request device 200 may acquire sensing data (or second data) obtained by sensing a user's body through the camera module 250 or the sensor module 260. For example, the identity authentication request device 200 may acquire a face image as sensing information (or second data) by imaging the user's face through the camera module 250.

In operation 303, the identity authentication request device 200 may transmit the sensing information (or the second data) to the server 300 using the wireless communication circuit 210. For example, the identity authentication request device 200 may transmit the face image to the server 300 as the sensing information (or the second data). Here, the sensing information (or the second data) may be raw data transmitted from the camera module 250 or the sensor module 260, and the raw data is only transmitted to the identity authentication device 100 through the wireless communication circuit 210 without being stored in the memory 230 of the identity authentication request device 200.

In operation 304, the identity authentication request device 200 may receive identification information from the server 300 through the wireless communication circuit 210. In the exemplary embodiment, the identification information for identifying the identity authentication device 100 may be implemented in various ways. For example, the identification information may be any one of a phone number and a PIN for specifying the identity authentication device 100 in which the biometric information (or first data) of the user is stored. The identity authentication request device 200 may specify the identity authentication device 100 to which the sensing information (or the second data) will be transmitted on the basis of the identification information.

In operation 305, the identity authentication request device 200 may transmit the sensing information (or the second data) to the specified identity authentication device 100 through the wireless communication circuit 210. For example, the identity authentication request device 200 may transmit the face image to the identity authentication device 100 as the sensing information (or the second data).

In operation 306, the identity authentication request device 200 may receive authentication data from the identity authentication device 100 through the wireless communication circuit 210. Here, the authentication data may include a first result representing that the biometric information (or the first data) of the user corresponds to the sensing information (or the second data) or a second result representing that the biometric information (or the first data) of the user does not correspond to the sensing information (or the second data).

In operation 307, when authentication data including the first result is received from the identity authentication device 100, the identity authentication request device 200 may perform a predetermined first function according to successful authentication. For example, when it is determined to perform a function of opening a gate upon successful authentication, the identity authentication request device 200 may open the gate.

Meanwhile, when authentication data including the second result is received from the identity authentication device 100, the identity authentication request device 200 may perform a predetermined second function according to failed authentication. For example, when it is determined to output a failure notification message and a beep sound through the input/output device 240 upon failed authentication, the identity authentication request device 200 may output the text message "Authentication has failed" and output a voice message such as "Authentication has failed. Try again please."

FIG. 10 is a flowchart illustrating a method of specifying, by a server, a user whose identity authentication is requested using sensing data obtained by sensing a user's body and transmitting identification information to an identity authentication request device according to an exemplary embodiment of the present disclosure.

Referring to FIGS. 1 and 4, in operation 401, the server 300 may receive personal information of a user of the identity authentication device 100 from the identity authentication device 100. The personal information of the user is information requested by the server 300 and may include one or more items for an administrator (or operator), who manages a service provided by the identity authentication request device 200, to identity the user. For example, the personal information on the user may include at least one of a phone number, a PIN, an ID, a password, a name, a sex, an address, an e-mail address, an identification number (e.g., a membership registration number) related to the service provided by the identity authentication request device 200, the type of service in use, and details of the service. The identity authentication request device 200 may request the identity authentication device 100 to transmit the personal information of the user using an application.

According to the exemplary embodiment, the server 300 may generate a lookup table on the basis of personal information of users. Here, the lookup table may be a table in which each of a plurality of users corresponds to identification information of one of the users. For example, the identification information may be a mobile phone number or a PIN for specifying the identity authentication device 100 in which biometric information (or first data) of a specific user is stored. However, the lookup table is not limited thereto and may be updated when the user manually inputs his or her identification information through the application.

In operation 402, the server 300 may receive sensing information (or second data) from the identity authentication request device 200 to specify the user (or the identity authentication device 100). To perform an identity authentication operation, the identity authentication request device 200 requires identification information for specifying the identity authentication device 100 to which the sensing information (or the second data) will be transmitted. According to the exemplary embodiment of the present disclosure, to prevent the security problem of biometric information leakage, a determination of whether the biometric information (or the first data) of the user corresponds to the sensing information (or the second data) is not performed in a specific service server (not shown) but performed in the identity authentication device 100. Accordingly, unlike the specific service server having a fixed Internet protocol (IP) address, it is necessary to specify the identity authentication device 100 for performing identity authentication. However, a procedure of sensing the user's body and inputting an identification number for specifying the identity authentication device 100 for identity authentication every time is contrary to the trend of non-face-to-face and contactless authentication. Therefore, a method is required to automatically acquire an identification number using sensing information (or second data).

According to the exemplary embodiment, the identity authentication request device 200 may acquire the sensing data (or the second data) obtained by sensing the user's body through the camera module 250 or the sensor module 260. For example, the identity authentication request device 200 may acquire a face image as sensing information (or second data) by imaging the user's face through the camera module 250.

In operation 403, the server 300 may specify the user (or the identity authentication device 100) from the received sensing information (or the second data) of the user through machine learning. As described above, the sensing information (or the second data) of the user may include an image file, a voice file, an electronic document, and the like. As an example, a case in which the sensing information (or the second data) of the user is in the form of an image file will be described below for convenience of description.

In this case, the biometric information extractor 310 may extract face information of the user from the image through machine learning. For example, the biometric information extractor 310 may extract the face information using at least one of a Haar-like algorithm and a CNN algorithm. In other words, the biometric information extractor 310 may use an algorithm obtained by combining characteristics of the Haar-like algorithm and the CNN algorithm. The CNN algorithm exhibits excellent performance in big data processing.

According to the exemplary embodiment, the biometric information extractor 310 may extract the biometric information (or the first data) on the basis of cumulative machine learning data stored in the database 330 in advance. In this case, the cumulative machine learning data may be obtained by accumulating machine learning results of the biometric information extractor 310 on sensing information (or second data). The cumulative machine learning data may include only features of images for determining which user corresponds to a face extracted from an arbitrary image. In other words, the cumulative machine learning data does not function alone as biometric information (or first data) but may be information for determining who is a user requesting identity authentication from the image received from the identity authentication request device 200.

The matcher 320 of the server 300 may select personal information (e.g., identification information) of a user corresponding to the biometric information (or the first data) of the user extracted through the biometric information extractor 310 from among pieces of pre-stored personal information of a plurality of users.

According to the exemplary embodiment, the matcher 320 may determine whether the biometric information (or the first data) corresponds to a certain user's personal information on the basis of a lookup table pre-stored in the database 330. Here, the lookup table may include personal information (e.g., identification information) corresponding to each of the plurality of users. For example, the lookup table may be a table in which each of the plurality of users corresponds to identification information of one of the plurality of users. For example, the identification information may be a phone number or a PIN for identifying the identity authentication device 100 in which biometric information (or first data) of a specific user is stored.

According to the exemplary embodiment, the database 330 may store only cumulative data which is a machine learning result from the sensing information (or the second data) of the user and may not store either of the biometric information (or the first data) and the sensing information (or the second data). Here, the cumulative data may be updated every time the biometric information extractor 310 performs machine learning on an image received from the identity authentication request device 200. The database 330 may include a lookup table in which each of a plurality of users corresponds to identification information (e.g., mobile phone numbers or PINs) of one of the plurality of users.

In operation 404, the server 300 may transmit the identification information to the identity authentication request device 200. Accordingly, the identity authentication request device 200 may automatically specify the identity authentication device 100 to which the sensing information (or the second data) will be transmitted to perform an identity authentication operation.

Meanwhile, when authentication data is not received from the identity authentication device 100 within a preset period after the identity authentication request device 200 transmits the sensing information (or the second data) to the identity authentication device 100 specified on the basis of the identification information, the identity authentication request device 200 may output an identification failure message and transmit a retraining command to the server 300. This is because the sensing information (or the second data) may be considered as being transmitted to the wrong identity authentication device 100 on the basis of wrong identification information which is the wrong biometric information (or the first data) extracted from the sensing information (or the second data) of the user. The server 300 may increase the accuracy in extracting biometric information (or first data) from sensing information (or second data) of users through retraining.

FIG. 11 is a sequence diagram illustrating an identity authentication process triggered by an identity authentication request among an identity authentication device, an identity authentication request device, and a server according to an exemplary embodiment of the present disclosure.

Referring to FIGS. 1 to 5, the server 300 may extract identification information corresponding to biometric information (or second data) through machine learning, the identity authentication request device 200 may specify the identity authentication device 100 on the basis of the identification information, and the specified identity authentication device 100 may receive sensing information (or second data) from the identity authentication request device 200, determine whether to authenticate the user by comparing the received sensing information with biometric information (or first data), and transmit authentication or non-authentication confirmation data to the identity authentication request device 200. Each operation of FIG. 11 is as follows.

In operation 501, the identity authentication device 100 may store biometric information (or first data) of a user extracted on the basis of sensing data (or second data) obtained by sensing the user's body in the memory 130. The operation corresponds to operation 201 of FIG. 8.

In operation 502, the identity authentication device 100 may install an application related to the identity authentication request device 200 according to a selection of the user for using a service provided by the identity authentication request device 200. The operation corresponds to operation 202 of FIG. 8.

In operation 503, the identity authentication device 100 may transmit personal information of the user excluding biometric information of the user to the identity authentication request device 200 and the server 300 using the application. The operation corresponds to operation 203 of FIG. 8 and operation 301 of FIG. 9.

In operation 504, the identity authentication request device 200 and the server 300 may store the received personal information of the user in the memory 230 and the database 330, respectively.

In operation 505, the identity authentication request device 200 may transmit sensing information (or second data) to the server 300. The operation corresponds to operation 303 of FIG. 9.

In operation 506, through machine learning, the server 300 may determine identification information for specifying the identity authentication device 100 to which the sensing information (or the second data) will be transmitted. The biometric information extractor 310 may extract biometric information (e.g., face information) of the user from the sensing information (e.g., an image) through machine learning. The matcher 320 may select identification information (e.g., a mobile phone number or a PIN) of the user corresponding to the biometric information (or the face information) of the user extracted by the biometric information extractor 310 from personal information (e.g., identification information) of a plurality of users pre-stored in the database 330. The database 330 may include a lookup table in which each of the plurality of users corresponds to the identification information (e.g., mobile phone numbers or PINs) of one of the plurality of users. The operation corresponds to operation 403 of FIG. 10.

In operation 507, the server 300 may transmit the identification information to the identity authentication request device 200. The operation corresponds to operation 404 of FIG. 10.

In operation 508, the identity authentication request device 200 may specify the identity authentication device 100 to which the sensing information (the second data) will be transmitted on the basis of the identification information (e.g., a mobile phone number or a PIN). The operation corresponds to operation 304 of FIG. 9.

In operation 509, the identity authentication request device 200 may transmit the sensing information (or the second data) to the specified identity authentication device 100. The operation corresponds to operation 305 of FIG. 9.

In operation 510, the identity authentication device 100 may determine whether the sensing information (or the second data) received from the identity authentication request device 200 corresponds to the pre-stored biometric information (or the first data) of the user. The operation corresponds to operation 205 of FIG. 8.

In operation 511, the identity authentication device 100 may transmit authentication data to the identity authentication request device 200. Here, the authentication data may include a first result representing that the biometric information (or the first data) of the user corresponds to the sensing information (or the second data) or a second result representing that the biometric information (or the first data) of the user does not correspond to the sensing information (or the second data). The operation corresponds to operation 206 of FIG. 8.

In operation 512, the identity authentication request device 200 may perform a predetermined function according to a result value of the received authentication data. For example, when authentication data including the first result is received, the identity authentication request device 200 may perform a function of opening a gate. On the other hand, when authentication data including the second result is received, the identity authentication request device 200 may output an authentication failure message. The operation corresponds to operation 307 of FIG. 9.

Other exemplary embodiments will be described below. In the following embodiments, descriptions of the same configuration as in the above-described embodiments will be omitted or simplified, and differences will be mainly described.

FIG. 12 is a sequence diagram illustrating an identity authentication process triggered by an identity authentication request among an identity authentication device, an identity authentication request device, and a server according to another exemplary embodiment of the present disclosure.

The exemplary embodiment of FIG. 12 in which identity authentication is performed by at least two identity authentication devices 100_1 and 100_2 is different from the exemplary embodiment of FIG. 11 in which identity authentication is performed by the single identity authentication device 100. Although only two identity authentication devices are shown in FIG. 12 for convenience of description, the number of identity authentication devices is not limited thereto. Meanwhile, the first and second identity authentication devices 100_1 and 100_2 have substantially the same configuration as the identity authentication device 100 shown in FIG. 7, and thus like components will be indicated by like reference numerals.

Specifically, referring to FIGS. 1 to 6, the server 300 may extract identification information corresponding to biometric information (or second data) through machine learning, the identity authentication request device 200 may specify the first and second identity authentication devices 100_1 and 100_2 on the basis of the identification information, and each of the specified first and second identity authentication devices 100_1 and 100_2 may receive first sensing information (or second data) from the identity authentication request device 200, combine first sub-biometric information pre-stored in the first identity authentication device 100_1 and second sub-biometric information pre-stored in the second identity authentication device 100_2 together, determine whether the first identity authentication device (or a first user) is authenticated by comparing the combined sub-biometric information with first biometric information (or first data) of a user, and transmit authentication or non-authentication confirmation data to the identity authentication request device 200. Each operation of FIG. 12 is as follows.

In operation 601, the first identity authentication device 100_1 may store first biometric information (or first data) of a first user extracted on the basis of sensing data (or second data) obtained by sensing the first user's body in the memory 130. Likewise, the second identity authentication device 100_2 may store second biometric information (or first data) of a second user extracted on the basis of sensing data (or second data) obtained by sensing the second user's body in the memory 130. The operation corresponds to operation 201 of FIG. 8.

In operation 602, the first and second identity authentication devices 100_1 and 100_2 may install an application related to the identity authentication request device 200 according to selections of the first and second users for using a service provided by the identity authentication request device 200. The operation corresponds to operation 202 of FIG. 8.

In operation 603, the first identity authentication device 100_1 may transmit second sub-biometric information to the second identity authentication device 100_2. Here, the first biometric information of the first user may be divided into a plurality of pieces of sub-biometric information corresponding to the number of identity authentication devices connected to the identity authentication system 1. For example, when the two identity authentication devices 100_1 and 100_2 are included in the identity authentication system 1, the first biometric information may include first sub-biometric information and second sub-biometric information. Like the first biometric information, the second biometric information of the second user may be divided into a plurality of pieces of sub-biometric information corresponding to the number of identity authentication devices connected to the identity authentication system 1.

According to the exemplary embodiment, when biometric information is divided into a plurality of pieces of sub-biometric information corresponding to the number of identity authentication devices connected to the identity authentication system 1, each of the identity authentication devices does not store the complete biometric information, and thus security can be improved. In other words, in the first identity authentication device 100_1 shown in FIG. 12, the first biometric information is deleted, and the first sub-metric information is stored. Since the second identity authentication device 100_2 has substantially the same configuration as the first identity authentication device 100_1, overlapping description will be omitted.

In operation 604, the first biometric information may be stored in the first and second identity authentication devices 100_1 and 100_2 in a distributed manner. For example, the first sub-biometric information may be stored in the first identity authentication device 100_1, and the second sub-biometric information may be stored in the second identity authentication device 100_2.

In operation 605, the first identity authentication device 100_1 may transmit first personal information of the first user excluding the first biometric information of the first user to the identity authentication request device 200 and the server 300 using the application. Likewise, the second identity authentication device 100_2 may transmit second personal information of the second user excluding the second biometric information of the second user to the identity authentication request device 200 and the server 300 using the application. The operation corresponds to operation 203 of FIG. 8 and operation 301 of FIG. 9.

In operation 606, the identity authentication request device 200 and the server 300 may store the received first personal information of the first user and the received second personal information of the second user in the memory 230 and the database 330, respectively.

In operation 607, the identity authentication request device 200 may transmit first sensing information (or second data) of the first user to the server 300. This is on the assumption that identity authentication is requested for the first user of the first identity authentication device 100_1, and when identity authentication is requested for the second user of the second identity authentication device 100_2, second sensing information of the second user may be transmitted. The operation corresponds to operation 303 of FIG. 9.

In operation 608, through machine learning, the server 300 may determine identification information for specifying the first identity authentication device 100_1 to which the first sensing information (or the second data) will be transmitted. The biometric information extractor 310 may extract first biometric information (e.g., face information) of the first user from the first sensing information (e.g., an image) through machine learning. The matcher 320 may select identification information (e.g., a mobile phone number or a PIN) of the first user corresponding to the first biometric information (or the face information) of the first user extracted by the biometric information extractor 310 from personal information (e.g., identification information) of a plurality of users pre-stored in the database 330.

The database 330 may include a lookup table in which biometric information (or face information) of the plurality of users corresponds to the identification information (e.g., mobile phone numbers or PINs) of the plurality of users on a one-to-one basis. Meanwhile, when a plurality of identity authentication devices are included in the identity authentication system 1, the lookup table may be a table in which biometric information (or face information) of a user for whom identity authentication is requested corresponds to identification information (e.g., a mobile phone number and a PIN) of a plurality of identity authentication devices on a one-to-many basis. In this case, it is assumed that biometric information of the user for whom identity authentication is requested is stored in a distributed manner in the plurality of identity authentication devices. The operation corresponds to operation 403 of FIG. 10.

In operation 609, the server 300 may transmit the identification information to the identity authentication request device 200. The operation corresponds to operation 404 of FIG. 10.

In operation 610, the identity authentication request device 200 may specify the first and second identity authentication devices 100_1 and 100_2 to which the first sensing information (the second data) of the first user will be transmitted on the basis of the identification information (e.g., the mobile phone number or the PIN). The operation corresponds to operation 304 of FIG. 9.

In operation 611, the identity authentication request device 200 may transmit the first sensing information (or the second data) of the first user to each of the specified first and second identity authentication devices 100_1 and 100_2. The operation corresponds to operation 305 of FIG. 9.

In operation 612, the first identity authentication device 100_1 may receive the second sub-biometric information from the second identity authentication device 100_2 and generate the first biometric information by combining the pre-stored first sub-biometric information and the second sub-biometric information together. As described above, identity authentication is performed by a plurality of identity authentication devices, and thus security is improved.

In operation 613, the first identity authentication device 100_1 may determine whether the first sensing information (or the second data) received from the identity authentication request device 200 corresponds to the first biometric information (or the first data) combined in operation 612. The operation corresponds to operation 205 of FIG. 8.

In operation 614, the first identity authentication device 100_1 may transmit authentication data to the identity authentication request device 200. Here, the authentication data may include a first result representing that the first biometric information (or the first data) corresponds to the first sensing information (or the second data) or a second result representing that the first biometric information (or the first data) does not correspond to the first sensing information (or the second data). The operation corresponds to operation 206 of FIG. 8.

In operation 615, the identity authentication request device 200 may perform a predetermined function according to a result value of the received authentication data. For example, when authentication data including the first result is received, the identity authentication request device 200 may perform a function of opening a gate. On the other hand, when authentication data including the second result is received, the identity authentication request device 200 may output an authentication failure message. The operation corresponds to operation 307 of FIG. 9.

In one embodiment, the server 300 may communicate with a blockchain network. In the blockchain network, biometric information of a user of the identity authentication device 100 may be stored. A user's biometric information can be recorded in a blockchain node of the blockchain network as a transaction.

The identity authentication request device 200 may transmit sensing information about the user obtained by sensing the user to the server 300. The server 300 may acquire the user's biometric information from the block chain network in response to receiving the sensing information about the user from the identity authentication request device 200. In addition, the server 300 may compare the user's biometric information obtained from the block chain network with the sensing information about the user received from the identity authentication request device 200.

When the user's biometric information matches the user's sensing information, the server 300 may transmit an authentication result to the identity authentication request device 200. For example, the server 300 may transmit, as an authentication result, payment information for a user previously stored in the server 300 to the identity authentication request device 200. The identity authentication request device 200 may proceed with payment based on payment information obtained from the server 300. However, as an authentication result, the operation performed by the identity authentication request device 200 is not limited thereto, and various operations that may be related to authentication, such as opening a door or granting access to an app, may be performed without limitation. have.

In an embodiment, the identity authentication device 100 may receive sensing information from the identity authentication request device 200. The identity authentication device 100 may check information on the device that has transmitted the sensing information based on the stored information on the identity authentication request device 200. At this time, even if the user of the identity authentication device 100 does not input separate information (e.g., the identification number of the device that has transmitted the sensing information) to the identity authentication device 100, the identity authentication device 100 inside the processor 120 of the may check information about the device that has automatically transmitted the sensing information. In response to the sensing information being received from the identity authentication request device 200, the processor 120 may check whether the biometric information matches the biometric information even if there is no separate user input.

In an embodiment, a password may not be input when biometric information is stored in the identity authentication request device 200 and/or the server 300. In an embodiment, even if the identity authentication device 100 and the identity authentication request device 200 are not located close to each other, biometric information may be transmitted between the two devices through a long-distance communication method. In an embodiment, the identity authentication device 100 may selectively provide card information or coupon information when the user's biometric information and sensing information match each other. In an embodiment, the identity authentication device 100 may proceed with payment without going through the user's financial account identification process of the identity authentication request device 200.

The identity authentication system according to the exemplary embodiment of the present disclosure matches biometric information of a user to an identification code through machine learning and thus can allow non-face-to-face and contactless authentication which does not require the manual input of an identification code for identity authentication every time.

The security level of the identity authentication system according to the exemplary embodiment of the present disclosure can be improved through a blockchain.

Effects of the present disclosure are not limited to those described above, and other effects are included the detailed description.

The above-described embodiments may be implemented as a hardware component, a software component, and/or a combination of a hardware component and a software component. For example, the devices, methods, and components described in the exemplary embodiments may be implemented using one or more general-purpose computers or special purpose computers such as a processor, a controller, an arithmetic logic unit (ALU), a digital signal processor, a microcomputer, a field programmable gate array (FPGA), a programmable logic unit (PLU), a microprocessor, or any other device capable of executing and responding to an instruction. A processing device may execute an operating system (OS) and one or more software applications executed on the OS. In addition, the processing device may access, store, manipulate, process, and generate data in response to the execution of the software. For convenience of understanding, when a single processing device is described as being used in some cases, those of ordinary skill in the art recognize that the processing device may include a plurality of processing elements and/or a plurality of types of processing elements. For example, the processing device may include a plurality of processors or a single processor and a single controller. In addition, other processing configurations, such as a parallel processor, are also possible.

Software may include a computer program, code, an instruction, or one or more combinations thereof and may form the processing device to be operated as desired or may independently or collectively command the processing device. The software and/or data may be permanently or temporarily embodied in any type of machine, component, physical device, virtual equipment, computer storage medium or device, or in a propagated signal wave in order to be interpreted by the processing device or provide an instruction or data to the processing device. The software may be distributed over a networked computer system to be stored or executed in a distributed manner. The software and data may be stored on one or more computer-readable recording media.

The method according to the exemplary embodiment may be implemented in a program instruction form, which may be executed through various computing devices, and recorded on a computer-readable medium. The computer-readable medium may include program instructions, data files, data structures, etc. alone or in combination. The program instructions recorded on the medium may be specially designed and configured for the embodiment or may be known to and available for use by those of ordinary skill in the computer software field. Examples of the computer-readable recording medium include magnetic media, such as a hard disk, a floppy disk, and magnetic tape, optical recording media, such as a compact disc (CD)-ROM and a digital versatile disc (DVD), magneto-optical media, such as a floptical disk, and hardware devices which are specially configured to store and execute program instructions such as a ROM, a RAM, and a flash memory. Examples of the program instructions include not only machine language codes created by a compiler but also high-level language code that can be executed by a computer using an interpreter or the like. The above hardware devices may be changed to one or more software modules to perform the operations of the exemplary embodiment, and vice versa.

Although the present disclosure has been described above in connection with the limited embodiments and drawings, those skilled in the technical field to which the present disclosure pertains can make various modifications and alterations from the description. For example, proper results may be achieved even when the descriptions are performed in an order different from that of the above-described method and/or the components of the above-described system, structure, device, circuit, etc. are coupled or combined in a form different from that described above or replaced or substituted with other components or equivalents. Accordingly, other implementations, other embodiments, and the equivalents of the claims fall within the scope of the following claims.

Both an individual of a consumer side and a business provider of a supplier side may make a financial payment with low cost, using biometric information without deploying additional infrastructure, using already widely available mobile devices.

What is claimed is:

1. A processor-implemented method of authenticating a content of an operation requested by a second user at a first device of a first user, the method comprising:
    sensing, by a sensor provided in the first device of the first user, one or more pieces of biometric information of the second user;
    transmitting, by the first device, the sensed biometric information to a second device;
    receiving, by the first device, verification information from the second device, wherein the verification information is a verification result generated by the second device, and the verification information indicates whether the sensed biometric information, being transmitted by the first device, is verified by the second device to match biometric information of the second user that is pre-stored in the second device;
    authenticating, by the first device, the content of the requested operation using the verification information without exposing personal information of the second user to outside, in response to the sensed biometric information of the second user that is transmitted by the first device being verified to match the biometric information of the second user that is pre-stored in the second device; and
    processing a payment, as the requested operation, in a preset payment method that is preset by using the personal information of the second user,
    wherein the sensed biometric information is sensed information of a part of the second user's body and does not have personal information of the second user for an enhanced security, and
    wherein the method further comprises:
        transmitting, by the second device, the biometric information of the second user that is pre-stored in the second device to a server;
        transmitting, by the first device, the sensed biometric information to the server; and
        authenticating, by the server, whether the sensed biometric information and the pre-stored biometric information match.

2. The method according to claim 1, wherein the biometric information includes one or more of fingerprint information, iris information, vein information, electrocardiogram information, or voice information.

3. The method according to claim 1, further comprising encrypting, by the first device, the sensed biometric information using a predetermined encryption-decryption scheme.

4. The method according to claim 1, wherein the preset payment method comprises using a substitute key that corresponds to a password of a first payment means selected by the second user from among one or more payment means.

5. The method according to claim 1, wherein the sensed biometric information is not stored in the first device after being transmitted to the second device.

6. The method according to claim 4, wherein the first payment means is selected adaptively based on the payment content, from among preset one or more payment methods.

7. The method according to claim 1, further comprising converting the sensed biometric information to a file in a predetermined format and transmitting the file.

8. The method according to claim 3, wherein the predetermined encryption-decryption scheme is RC4, OTPad, DES, TDES, AES, IDEA, Dffie-Hellman, DSA, Elgamal, RSA, ECC, SHA, MD5, HAVAL, HMAC, or CBC-MAC.

9. The method according to claim 7, wherein the file in the predetermined format is an image file, a video file, or an audio file.

10. The method according to claim 7, wherein the format of the file is determined adaptively based on the sensed biometric information.

11. A processor-implemented method of performing an operation, requested from a first device, at a second device, the method comprising:
receiving, by the second device, biometric information of a second user from the first device of a first user, the biometric information being sensed by a sensor provided in the first device;
verifying, by the second device, whether the biometric information that is received from the first device matches biometric information of the second user that is pre-stored in the second device;
receiving, by the second device, a content of the requested operation from the first device, in response to the biometric information that is received from the first device being verified to match the biometric information of the second user that is pre-stored in the second device; and
performing, by the second device, the requested operation in a method that is selected based on a priority preset by the second user with regard to the content of the requested operation by using personal information of the second user, in response to the biometric information that is received from the first device, being verified to match the biometric information of the second user that is pre-stored in the second device,
wherein the biometric information, being received from the first device, is sensed information of a part of the second user's body and does not have the personal information of the second user for an enhanced security.

12. The method according to claim 11, further comprising receiving one or more pieces of biometric information.

13. The method according to claim 11, further comprising decrypting the received biometric information in a predetermined encryption-decryption scheme when the received biometric information has been encrypted.

14. The method according to claim 11, further comprising converting the received biometric information to a predetermined format.

15. The method according to claim 14, wherein the format is different from a file format of the received biometric information.

16. The method according to claim 11, wherein the sensed biometric information is transmitted to the second device without storing in the first device.

17. A device for authenticating a content of an operation requested by a second user at the device of a first user, the device comprising:
a sensor configured to sense one or more pieces of biometric information of the second user;
a transmitter configured to transmit the sensed biometric information to a second device;
a receiver configured to receive verification information from the second device in response to the transmission, wherein the verification information is a verification result generated by the second device, and the verification information indicates whether the biometric information, that is transmitted by the transmitter, is verified by the second device to match biometric information of the second user that is pre-stored in the second device; and
a processor configured to authenticate a content of the requested operation using the verification information without exposing personal information of the second user to outside, in response to the biometric information of the second user that is transmitted by the transmitter being verified to match the biometric information of the second user that is pre-stored in the second device,
wherein the biometric information is sensed information of a part of the second user's body and does not have personal information of the second user for an enhanced security, and
wherein the processor is configured to process a payment, as the requested operation, in a payment method that is preset by using the personal information of the second user.

18. The device according to claim 17, wherein the processor is configured to encrypt the sensed biometric information using a predetermined encryption-decryption scheme or convert the sensed biometric information to a file in a predetermined format to be transmitted by the transmitter.

19. A non-transitory computer readable medium containing program instructions executed by a processor to perform an operation, requested from a first device, at a second device, the program instructions when executed configured to:
receive, from the first device of a first user, biometric information sensed of a second user, the biometric information being sensed by a sensor provided in the first device;
verify whether the biometric information, that is received from the first device, matches biometric information of the second user that is pre-stored in the second device; and
in response to the biometric information being verified to match the pre-stored biometric information, receive a content of the requested operation from the first device, and perform the requested operation using the data that is obtained from the second user,
wherein the biometric information, being received from the first device, is sensed information of a part of the second user's body and does not have the personal information of the second user for an enhanced security between the first device and the second device.

20. The non-transitory computer readable medium of claim 19, wherein the program instructions are further configured to:
decrypt the received biometric information in a predetermined encryption-decryption scheme when the received biometric information has been encrypted; or
convert the received biometric information to a predetermined format.

* * * * *